US012632199B2

(12) United States Patent
Gowda et al.

(10) Patent No.: US 12,632,199 B2
(45) Date of Patent: May 19, 2026

(54) INITIALIZATION INFORMATION STORAGE VIRTUALIZATION SYSTEM

(71) Applicant: Dell Products L.P., Round Rock, TX (US)

(72) Inventors: Srinivas Giri Raju Gowda, Fremont, CA (US); Douglas Lang Farley, Round Rock, TX (US); Trevor Christian Cockrell, Hutto, TX (US); David Craig Lawson, Richardson, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/772,430

(22) Filed: Jul. 15, 2024

(65) Prior Publication Data
US 2026/0016995 A1     Jan. 15, 2026

(51) Int. Cl.
*G06F 3/06*          (2006.01)
(52) U.S. Cl.
CPC .......... *G06F 3/0664* (2013.01); *G06F 3/0604* (2013.01); *G06F 3/0679* (2013.01)
(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88;
(Continued)

(56) References Cited

U.S. PATENT DOCUMENTS 9,769,131  B1 *   9/2017  Hartley .............. H04W 12/033
11,340,990  B2    5/2022  Hsu et al.
(Continued)

OTHER PUBLICATIONS

Secure boot; Citrix; May 17, 2023; retrieved from https://web. archive.org/web/20230601091627/https://docs.citrix.com/en-us/citrix-daas/install-configure/security-policies/secure-boot.html (Year: 2023).*
M. Boubakri, F. Chiatante and B. Zouari, "Towards a firmware TPM on RISC-V," 2021 Design, Automation & Test in Europe Conference & Exhibition (DATE), Grenoble, France, 2021, pp. 647-650, doi: 10.23919/DATE51398.2021.9474152. (Year: 2021).*
(Continued)

*Primary Examiner* — Daniel C. Chappell
(74) *Attorney, Agent, or Firm* — Joseph Mencher

(57)          ABSTRACT

An initialization information storage virtualization system includes a resource system that is coupled to a resource management system and that includes a processing system coupled to a System Control Processor (SCP) device. The SCP device creates a virtual initialization information storage and a virtual Trusted Platform Module (vTPM) in its secure memory subsystem. The SCP device then receives resource system initialization information and resource system initialization authentication information for the resource system from the resource management system, populates the virtual initialization information storage with the resource system initialization information, and populates the vTPM with the resource system initialization authentication information. When the SCP device receives an initialization information request from the processing system, the SCP device provides the resource system initialization information and the resource system initialization authentication information to the processing system.

20 Claims, 31 Drawing Sheets

(58) Field of Classification Search
CPC ..... G06F 2003/0697; G06F 2009/3883; G06F
2009/45562–45595; G06F 2015/761–768;
G06F 2201/00–885; G06F 2206/00–20;
G06F 2209/00–549; G06F 2211/00–902;
G06F 2212/00–7211; G06F
2213/00–4004; G06F 2216/00–17; G06F
2221/00–2153; G06N 3/00–126; G06N
5/00–048; G06N 7/00–08; G06N 10/00;
G06N 20/00–20; G06N 99/00–007; G06T
1/00–60; G06V 30/00–43; G11B
20/00–24; G11B 33/00–1493; G11C
11/00–5692; G11C 13/00–06; G11C
14/00–009; G11C 15/00–06; G11C
16/00–3495; G11C 17/00–18; G11C
2207/00–229; G11C 2216/00–30; H01L
25/00–50; H01L 2225/00–1094; H03M
7/00–707; H04L 9/00–38; H04L
12/00–66; H04L 41/00–5096; H04L
49/00–9094; H04L 61/00–59; H04L
67/00–75
See application file for complete search history.

(56) References Cited

U.S. PATENT DOCUMENTS

| | | | | |
|---|---|---|---|---|
| 11,809,571 | B2 | 11/2023 | Bosch et al. | |
| 2006/0224878 | A1* | 10/2006 | Datta .................... | G06F 21/575 |
| | | | | 713/2 |
| 2009/0327741 | A1* | 12/2009 | Zimmer ................ | G06F 21/575 |
| | | | | 713/2 |
| 2019/0339888 | A1* | 11/2019 | Sasidharan .......... | G06F 3/0679 |

OTHER PUBLICATIONS

D. Chang, X. Chu, Y. Qin and D. Feng, "TSD: A Flexible Root of Trust for the Cloud, " 2012 IEEE 11th International Conference on Trust, Security and Privacy in Computing and Communications, Liverpool, UK, 2012, pp. 119-126, doi: 10.1109/TrustCom.2012. 287. (Year: 2012).*

J. Thijsman, M. Sebrechts, F. De Turck and B. Volckaert, "Trusting the Cloud-Native Edge: Remotely Attested Kubernetes Workers," 2024 33rd International Conference on Computer Communications and Networks (ICCCN), Kailua-Kona, HI, USA, 2024, pp. 1-6, doi: 10.1109/ICCCN61486.2024.10637515. (Year: 2024).*

* cited by examiner

302

RESOURCE
MANAGEMENT
SYSTEM
304

RESOURCE
SYSTEM
306a

RESOURCE
SYSTEM
306b

RESOURCE
SYSTEM
306c

LCS PROVISIONING SUBSYSTEM 300

402

RESOURCE SYSTEM 400

SCP
DEVICE
406

RESOURCE
DEVICE
404a

RESOURCE
DEVICE
404b

RESOURCE
DEVICE
404c

CLIENT DEVICE 202

LCS 500

PROCESSING RESOURCE 502

MEMORY RESOURCE 504

NETWORKING RESOURCE 506

STORAGE RESOURCE 508

RESOURCE MANAGEMENT SYSTEM 304

Figure 10:
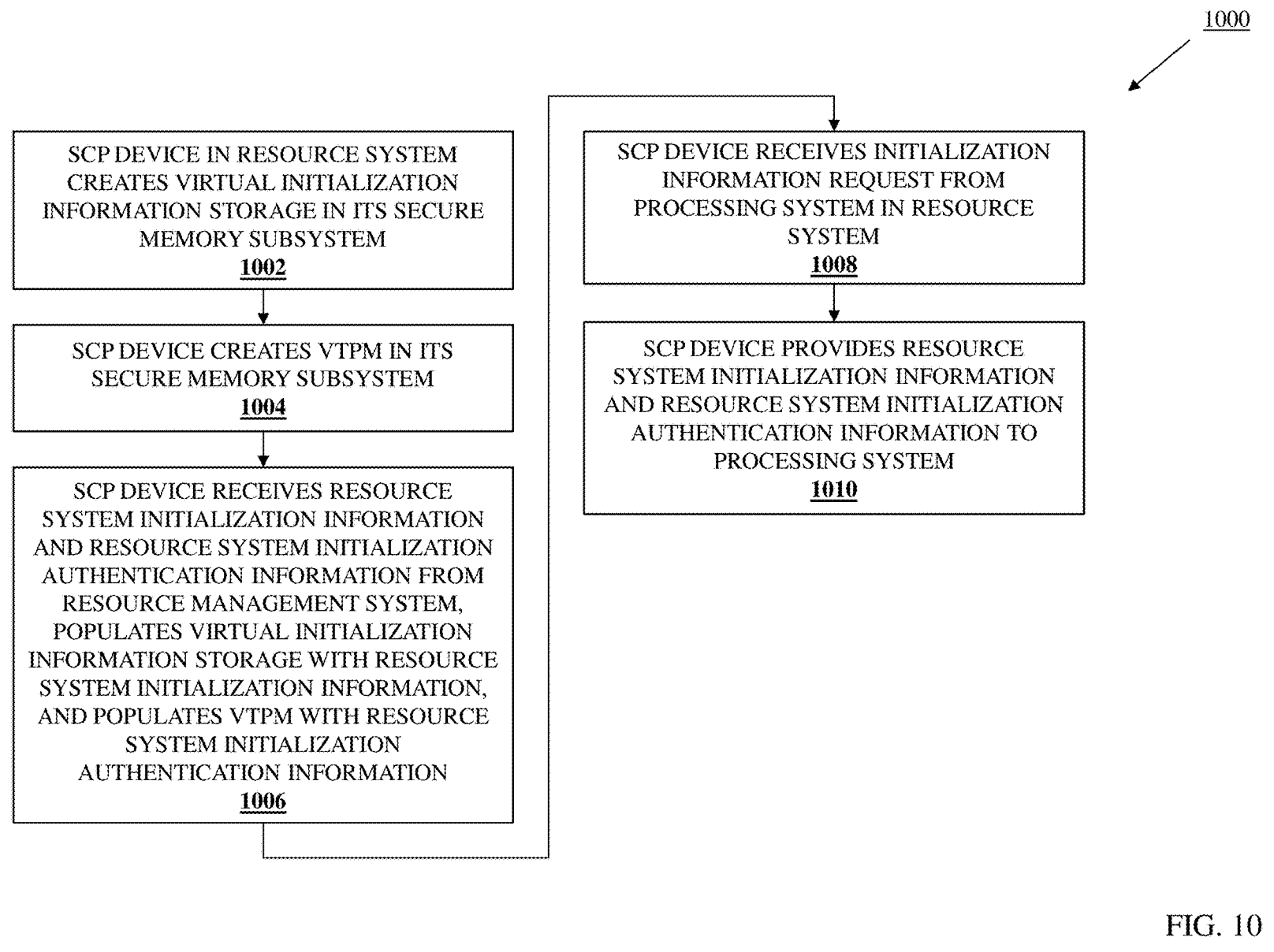

SCP DEVICE IN RESOURCE SYSTEM CREATES VIRTUAL INITIALIZATION INFORMATION STORAGE IN ITS SECURE MEMORY SUBSYSTEM
1002

SCP DEVICE CREATES VTPM IN ITS SECURE MEMORY SUBSYSTEM
1004

SCP DEVICE RECEIVES RESOURCE SYSTEM INITIALIZATION INFORMATION AND RESOURCE SYSTEM INITIALIZATION AUTHENTICATION INFORMATION FROM RESOURCE MANAGEMENT SYSTEM, POPULATES VIRTUAL INITIALIZATION INFORMATION STORAGE WITH RESOURCE SYSTEM INITIALIZATION INFORMATION, AND POPULATES VTPM WITH RESOURCE SYSTEM INITIALIZATION AUTHENTICATION INFORMATION
1006

SCP DEVICE RECEIVES INITIALIZATION INFORMATION REQUEST FROM PROCESSING SYSTEM IN RESOURCE SYSTEM
1008

SCP DEVICE PROVIDES RESOURCE SYSTEM INITIALIZATION INFORMATION AND RESOURCE SYSTEM INITIALIZATION AUTHENTICATION INFORMATION TO PROCESSING SYSTEM
1010

INITIALIZATION INFORMATION STORAGE VIRTUALIZATION SYSTEM

CROSS-REFERENCE TO RELATED APPLICATION

The present application is related to co-pending U.S. patent application Ser. No. 18/772,631, filed Jul. 15, 2024.

BACKGROUND

The present disclosure relates generally to information handling systems, and more particularly to virtualizing the storage for initialization information used to initialize an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices (e.g., "Bare Metal Servers (BMSs)) and/or other computing devices known in the art, may be utilized to provide Logically Composed Systems (LCSs) that perform workloads. For example, a user or administrator may provide a request to perform a workload, a server device may be selected for providing the LCS that is configured to perform that workload, and the resources of that server device may then be subsequently used to provide the LCS that performs that workload. Prior to providing such an LCS, the server device must be booted and/or otherwise initialized, and the conventional initialization of such server devices can raise issues. For example, conventional computing devices typically include a Basic Input/Output System (BIOS) boot controller that initializes the computing device using a BIOS Serial Peripheral Interface (SPI) flash memory device and a Trusted Platform Module (TPM) device that are each provided by physical devices that are included in the computing device. However, such physical devices are subject to attacks by malicious actors, and each require separate security subsystems in order to defend against such attacks, which raises the costs of the server device.

Accordingly, it would be desirable to provide a computing device initialization system that addresses the issues discussed above.

SUMMARY

According to one embodiment, an Information Handling System (IHS) includes a System Control Processor (SCP)

processing system; and an SCP memory system that is coupled to the SCP processing system and that includes instructions that, when executed by the SCP processing system, cause the SCP processing system to provide an SCP engine that is configured to: create a virtual initialization information storage in a secure portion of the memory system; create a virtual Trusted Platform Module (vTPM) in the secure portion of the memory system; receive, from a resource management system, resource system initialization information for a resource system that includes the SCP processing system, and populate the virtual initialization information storage with the resource system initialization information; receive, from the resource management system, resource system initialization authentication information for the resource system, and populate the vTPM with the resource system initialization authentication information; receive an initialization information request from a host processing system that is included in the resource system; and provide, in response to the initialization information request, the resource system initialization information and the resource system initialization authentication information to the host processing system.

BRIEF DESCRIPTION OF THE DRAWINGS

FIG. 10 is a flow chart illustrating an embodiment of a method for virtualizing storage for computing device initialization information.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
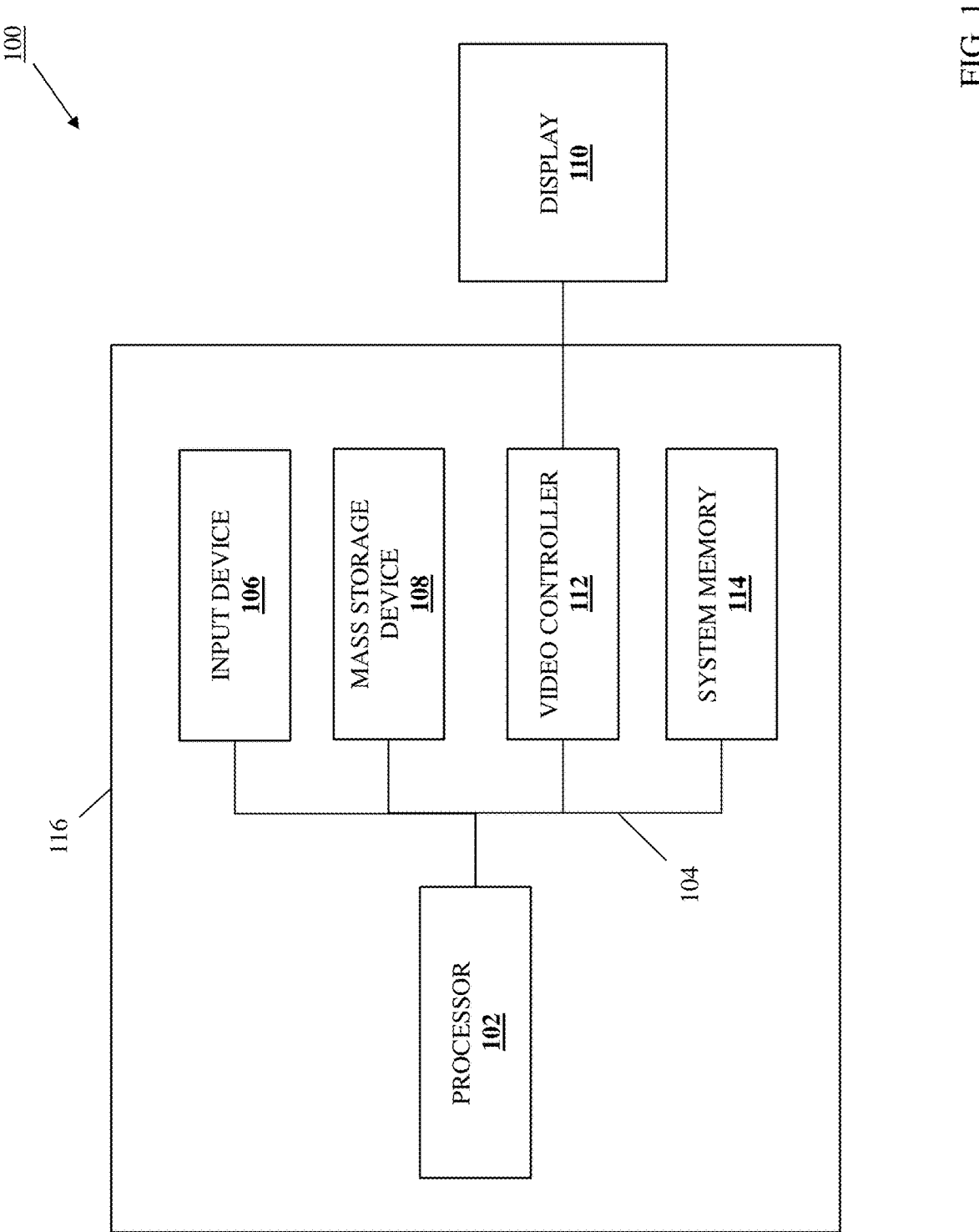
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the initialization information storage virtualization systems and methods of the present disclosure may be utilized with Logically Composed Systems (LCSs), which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
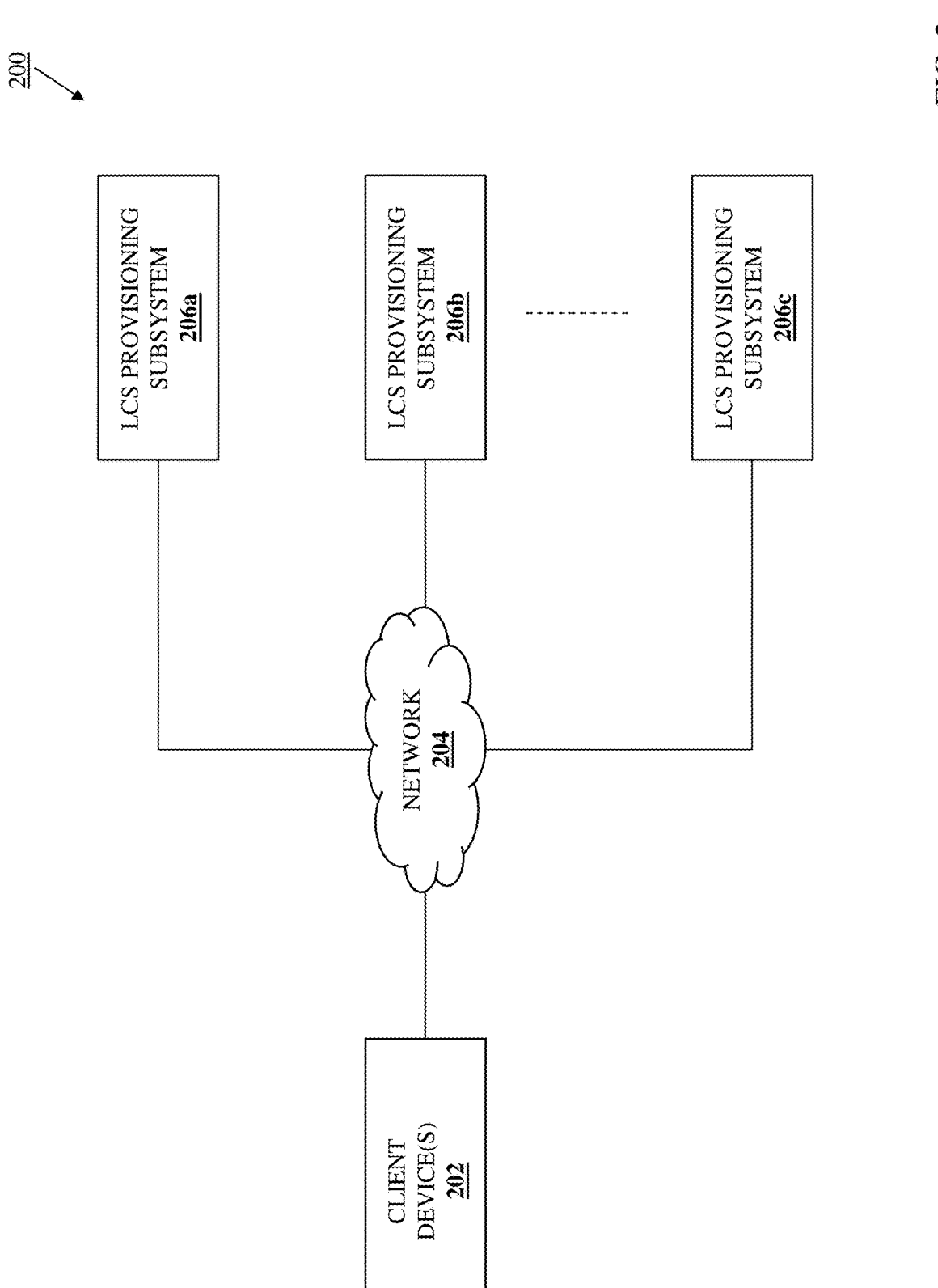
FIG. 2 is a schematic view illustrating an embodiment of an LCS provisioning system.

With reference to FIG. 2, an embodiment of a Logically Composed System (LCS) provisioning system 200 is illustrated that may be utilized with the initialization information storage virtualization systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206a, 206b, and up to 206c are coupled to the network 204 such that any or all of those LCS provisioning subsystems 206a-206c may provide LCSs to the client device(s) 202 as discussed in further detail below. In an embodiment, any or all of the LCS provisioning subsystems 206a-206c may include one or more of the IHS 100 discussed above with reference to FIG. 1 and/or may include some or all of the components of the IHS 100. For example, in some of the specific examples provided below, each of the LCS provisioning subsystems 206a-206c may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206a-206c) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206a-206c discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306a, 306b, and up to 306c. In an embodiment, any of the resource management system 304 and the resource systems 306a-306c may be provided by the IHS 100 discussed above with reference to FIG. 1 and/or may include some or all of the components of the IHS 100. In the specific embodiments provided below, each of the resource management system 304 and the resource systems 306a-306c may include a System Control Processor (SCP) device that may be conceptualized as an "enhanced" SmartNIC device that may be configured to perform functionality that is not available in conventional SmartNIC devices such as, for example, the resource management functionality, LCS provisioning functionality, and/or other SCP functionality described herein.

In an embodiment, any of the resource systems 306a-306c may include any of the resources described below coupled to an SCP device that is configured to facilitate management of those resources by the resource management system 304. Furthermore, the SCP device included in the resource management system 304 may provide an SCP Manager (SCPM) subsystem that is configured to manage the SCP devices in the resource systems 306a-306c, and that performs the functionality of the resource management system 304 described below. In some examples, the resource management system 304 may be provided by a "stand-alone" system (e.g., that is provided in a separate chassis from each of the resource systems 306a-306c), and the SCPM subsystem discussed below may be provided by a dedicated SCP device, processing/memory resources, and/or other components in that resource management system 304. However, in other embodiments, the resource management system 304 may be provided by one of the resource systems 306a-306c (e.g., it may be provided in a chassis of one of the resource systems 306a-306c), and the SCPM subsystem may be provided by an SCP device, processing/memory resources, and/or any other any other components om that resource system.

As such, the resource management system 304 is illustrated with dashed lines in FIG. 3 to indicate that it may be a stand-alone system in some embodiments, or may be provided by one of the resource systems 306a-306c in other embodiments. Furthermore, one of skill in the art in possession of the present disclosure will appreciate how SCP devices in the resource systems 306a-306c may operate to "elect" or otherwise select one or more of those SCP devices to operate as the SCPM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306a-306c discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406. In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404a, 404b, and up to 404c, each of which is coupled to the SCP device 406. For example, the resource devices 404a-404c may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM) devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404a-404c discussed below. As such, the resource devices 404a-404c in the resource systems 306a-306c/400 may be considered a "pool" of resources that are available to the resource management system 304 for use in composing LCSs.

To provide a specific example, the SCP devices described herein may operate to provide a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. Further, as discussed below, the SCP devices describe herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. However, while an SCP device is illustrated and described as performing the functionality discussed below, one of skill in the art in possession of the present disclosure will appreciated that functionality described herein may be enabled on other devices while remaining within the scope of the present disclosure as well.

Thus, the resource system 400 may include the chassis 402 including the SCP device 406 connected to any combinations of resource devices. To provide a specific embodiment, the resource system 400 may provide a "Bare Metal Server" that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404a-404c. For example, the chassis 402 of the resource system 400 may house a plurality of processing systems (i.e., the resource devices 404a-404c) coupled to the SCP device 406. In another example, the chassis 402 of the resource system 400 may house a plurality of memory systems (i.e., the resource devices 404a-404c) coupled to the SCP device 406. In another example, the chassis 402 of the resource system 400 may house a plurality of storage devices (i.e., the resource devices 404a-404c) coupled to the SCP device 406. In another example, the chassis 402 of the resource system 400 may house a plurality of networking devices (i.e., the resource devices 404a-404c) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404a-404c for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404a-404c while remaining within the scope of the present disclosure as well.

Figure 5:
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TBs of Accelerator PMEM memory capacity"). As will be appreciated by one of skill in the art in possession of the present disclosure, the workload intent discussed above may be provided to one of the LCS provisioning subsystems 206a-206c, and may be satisfied using resource systems that are included within that LCS provisioning subsystem, or satisfied using resource systems that are included across the different LCS provisioning subsystems 206a-206c.

As such, the resource management system 304 in the LCS provisioning subsystem that received the workload intent may operate to compose the LCS 500 using resource devices 404a-404c in the resource systems 306a-306c/400 in that LCS provisioning subsystem, and/or resource devices 404a-404c in the resource systems 306a-306c/400 in any of the other LCS provisioning subsystems. FIG. 5 illustrates the LCS 500 including a processing resource 502 allocated from one or more processing systems provided by one or more of the resource devices 404a-404c in one or more of the resource systems 306a-306c/400 in one or more of the LCS provisioning subsystems 206a-206c, a memory resource 504 allocated from one or more memory systems provided by one or more of the resource devices 404a-404c in one or more of the resource systems 306a-306c/400 in one or more of the LCS provisioning subsystems 206a-206c, a networking resource 506 allocated from one or more networking devices provided by one or more of the resource devices 404a-404c in one or more of the resource systems 306a-306c/400 in one or more of the LCS provisioning subsystems 206a-206c, and/or a storage resource 508 allocated from one or more storage devices provided by one or more of the resource devices 404a-404c in one or more of the resource systems 306a-306c/400 in one or more of the LCS provisioning subsystems 206a-206c.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306a-306c/400 that allocate any of the resource devices 404a-404c that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TBs of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508, if needed.

Figure 6:
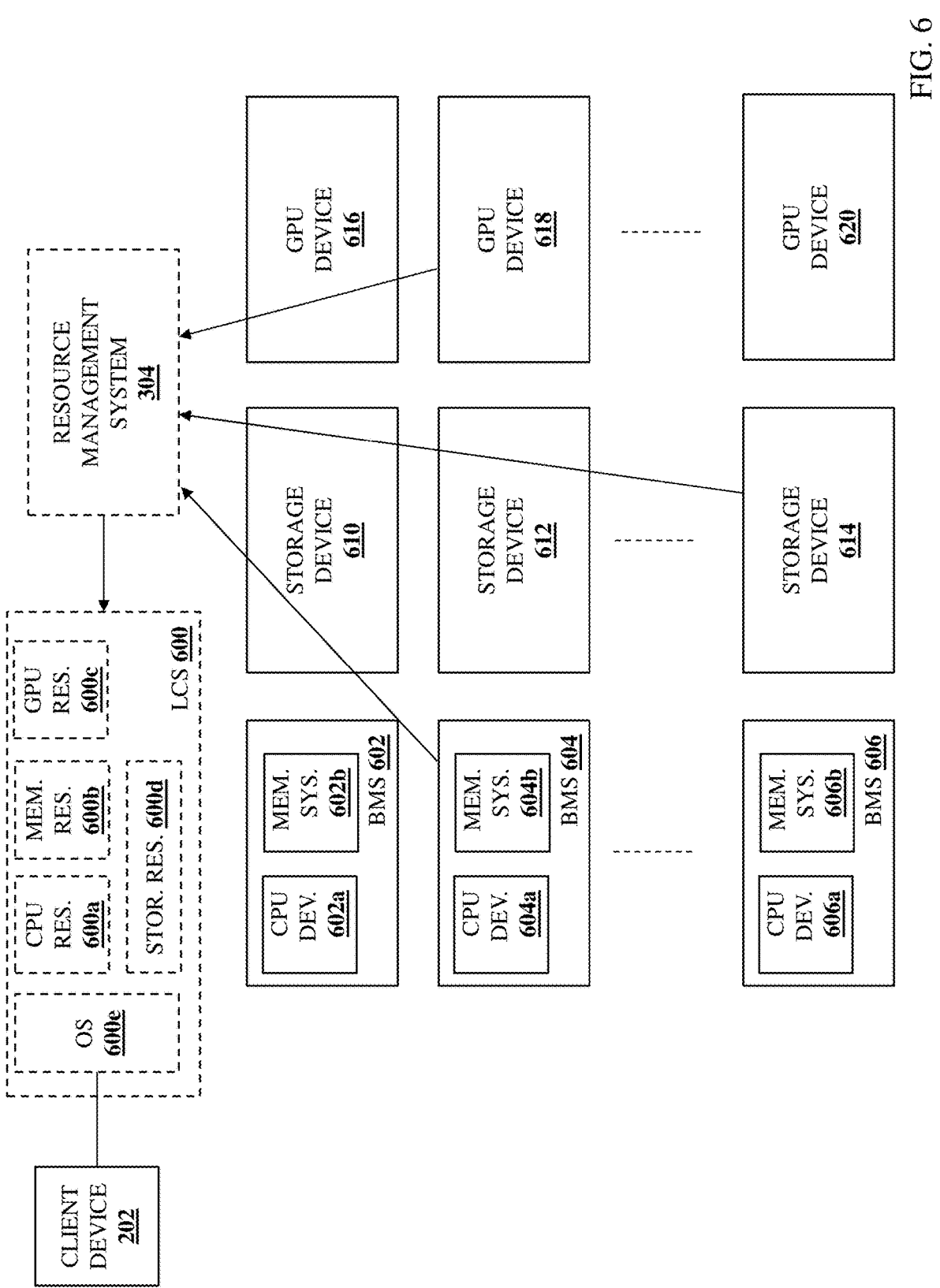
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306a-306c available to the resource management system 304 include a Bare Metal Server (BMS) 602 having a Central Processing Unit (CPU) device 602a and a memory system 602b, a BMS 604 having a CPU device 604a and a memory system 604b, and up to a BMS 606 having a CPU device 606a and a memory system 606b. Furthermore, one or more of the resource systems 306a-306c includes resource devices 404a-404c provided by a storage device 610, a storage device 612, and up to a storage device 614. Further still, one or more of the resource systems 306a-306c includes resource devices 404a-404c provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600a that utilize the CPU device 604*a* in the BMS 604, and memory resources 600*b* that utilize the memory system 604*b* in the BMS 604. Furthermore, the resource management system 304 may compose the LCS 600 using the storage device 614 to provide the LCS 600 with storage resources 600*d*, and using the GPU device 318 to provide the LCS 600 with GPU resources 600*c*. As illustrated in the specific example in FIG. 6, the CPU device 604*a* and the memory system 604*b* in the BMS 604 may be configured to provide an operating system 600*e* that is presented to the client device 202 as being provided by the CPU resources 600*a* and the memory resources 600*b* in the LCS 600, with operating system 600*e* utilizing the GPU device 618 to provide the GPU resources 600*c* in the LCS 600, and utilizing the storage device 614 to provide the storage resources 600*d* in the LCS 600. The user of the client device 202 may then provide any application(s) on the operating system 600*e* provided by the CPU resources 600*a*/CPU device 604*a* and the memory resources 600*b*/memory system 604*b* in the LCS 600/BMS 604, with the application(s) operating using the CPU resources 600*a*/ CPU device 604*a*, the memory resources 600*b*/memory system 604*b*, the GPU resources 600*c*/GPU device 618, and the storage resources 600*d*/storage device 614.

Furthermore, as discussed above, the SCP device(s) 406 in the resource systems 306*a*-306*c*/400 that allocates any of the CPU device 604*a* and memory system 604*b* in the BMS 604 that provide the CPU resource 600*a* and memory resource 600*b*, the GPU device 618 that provides the GPU resource 600*c*, and the storage device 614 that provides storage resource 600*d*, may also allocate SCP hardware and/or perform enhanced functionality (e.g., the enhanced storage functionality in the specific examples provided above) for any of those resources that may otherwise not be available in the CPU device 604*a*, memory system 604*b*, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600*c* may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/ time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600*a*, the memory resources 600*b*, the GPU resources 600*c*, and the storage resources 600*d*, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being underutilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

Figure 7:
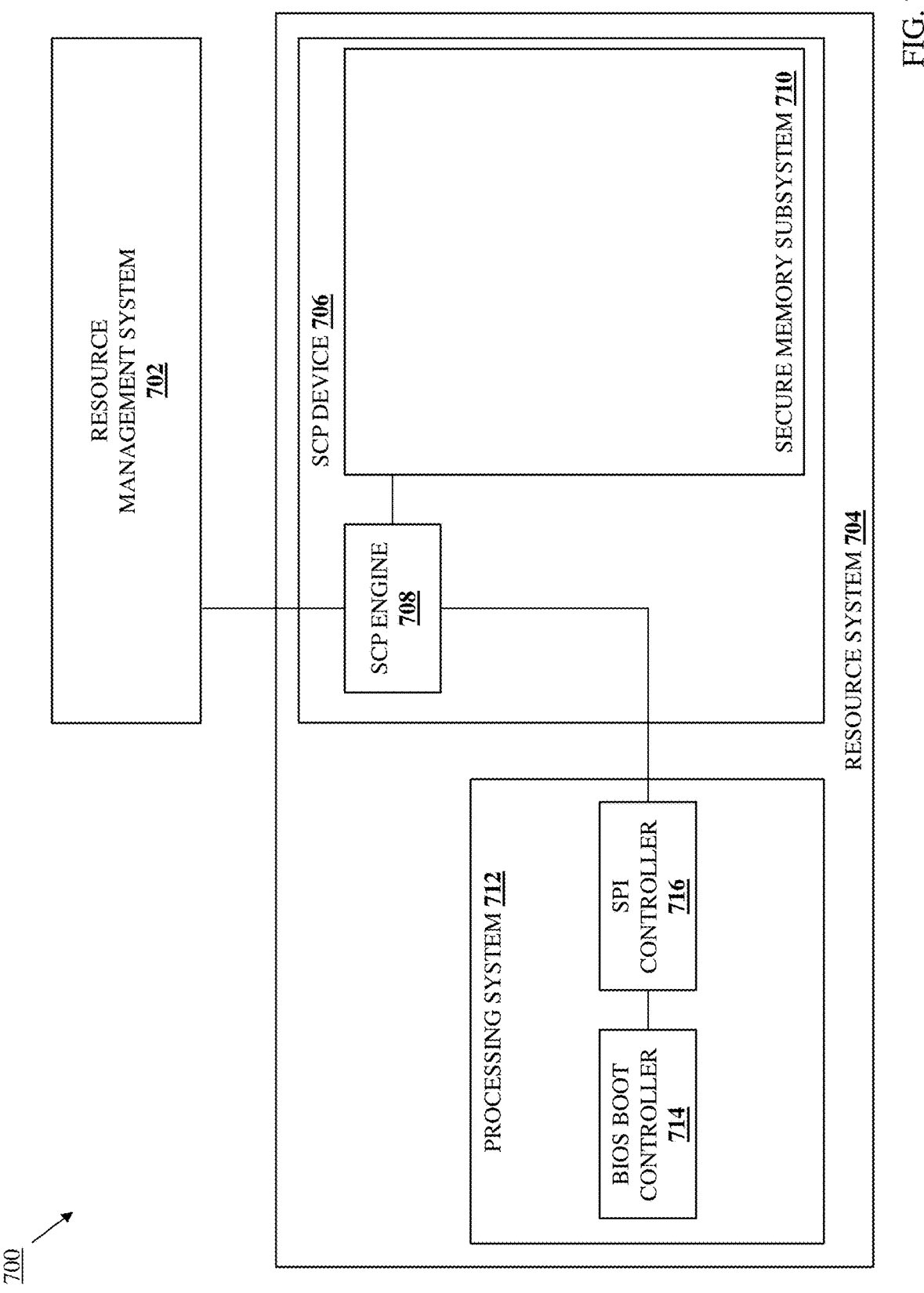
FIG. 7 is a schematic view illustrating an embodiment of an LCS provisioning system that may provide the initialization information storage virtualization system of the present disclosure.

Referring now to FIG. 7, an embodiment of an LCS provisioning system 700 is illustrated that may provide the initialization information storage virtualization system of the present disclosure. In the illustrated embodiment, the LCS provisioning system 700 may be provided using the LCS provisioning system 200 described above with reference to FIG. 2 and the LCS provisioning subsystem described above with reference to FIG. 3, and may operate similarly as described with reference to FIGS. 5 and 6. The LCS provisioning system 700 includes a resource management system 702 that may be provided by the resource management system 304 of FIGS. 3, 5, and/or 6.

The LCS provisioning system 700 also includes a resource system 704 that one of skill in the art in possession of the present disclosure will appreciate is initialized using initialization information stored in the virtualized initialization information storage described below. As will be appreciated by one of skill in the art in possession of the present disclosure, the resource system 704 may be provided by any of the resource systems 306*a*, 306*b*, and 306*c* of FIG. 3; the resource system 400 of FIG. 4; the BMSs 602, 604, and 606 of FIG. 6; and/or any other resource systems described above. In the illustrated embodiment, the resource system 704 includes an SCP device 706 that may be provided by the SCP device 406 discussed above with reference to FIG. 4, and/or any other SCP device described above.

Similarly as described above, the SCP device 706 may include an SCP processing system (not illustrated, but which may include the processor 102 discussed above with reference to FIG. 1) and an SCP memory system (not illustrated, but which may include the memory 114 discussed above with reference to FIG. 1) that is coupled to the SCP processing system and that includes instructions that, when executed by the SCP processing system, cause the SCP processing system to provide an SCP engine 708 that is configured to perform the functionality of the SCP engines and/or SCP devices discussed below. Furthermore, the SCP device 706 also includes a secure memory subsystem 710 that is coupled to the SCP engine 708 (e.g., via a coupling between the SCP processing system and the secure memory subsystem 710), and may be provided by the SCP memory system that provides the SCP engine 708 and/or other memory subsystem that are included in or otherwise accessible to the SCP engine 708. As will be appreciated by one of skill in the art in possession of the present disclosure, the secure memory subsystem 710 may be "secured" using Software Guard extensions (SGX) or Total Memory Encryption (TME) available from INTEL® Corporation of Santa Clara, California, United States; ARM® Security Extensions available from ARM® of Santa Clara, California, United States; as well as using other memory securing techniques that would be apparent to one of skill in the art in possession of the present disclosure.

In the illustrated embodiment, the resource system 708 also includes a processing system 712 that may include the processor 102 discussed above with reference to FIG. 1 such as a Central Processing Unit (CPU) or other host processing system known in the art, the CPU devices 602a-606a in the BMSs 602/606, respectively, and/or other "host" processing systems that would be apparent to one of skill in the art in possession of the present disclosure. In the embodiments illustrated and described below, the processing system 712 provides an initialization controller such as the Basic Input/Output System (BIOS) boot controller 714 illustrated in FIG. 7 that may be provided by BIOS firmware that is configured to perform hardware initialization during an initialization process (e.g., Power-On Start-up (POST)) for the resource system 708, runtime services for operating systems and application provided on the resource system 708, and/or other BIOS functionality known in the art. However, one of skill in the art in possession of the present disclosure will appreciate how the initialization controller in the processing system 712 may be provided according to Unified Extensible Firmware Interface (UEFI) specifications, and/or other initialization subsystems while remaining within the scope of the present disclosure.

In the embodiment introduced in FIG. 7 and discussed in further detail below, the processing system includes a Serial Peripheral Interface (SPI) controller 716 that is coupled to the BIOS boot controller 714 and to the SCP engine 708 (e.g., via the SCP processing system) in the SCP device 706. As will be appreciated by one of skill in the art in possession of the present disclosure, the embodiment introduced in FIG. 7 and discussed in further detail below utilizes a SPI connection for all communications between the processing system 712 and the SCP device 706. However, while a specific LCS providing system 700 for providing the initialization information storage virtualization system of the present disclosure has been illustrated and described, one of skill in the art in possession of the present disclosure will appreciate how the initialization information storage virtualization system of the present disclosure may be provided using a variety of components and/or component configurations while remaining within the scope of the present disclosure as well.

Figure 8:
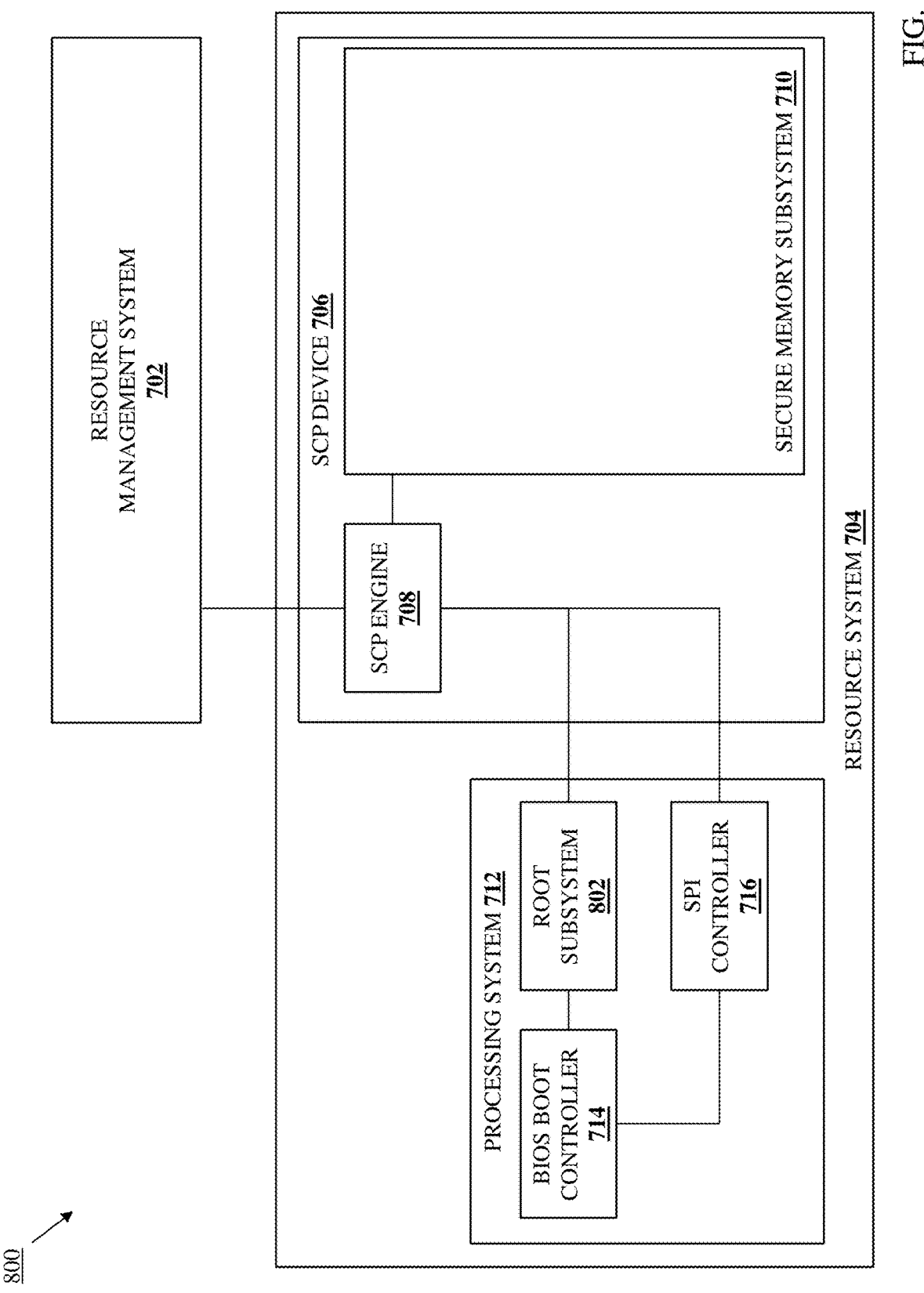
FIG. 8 is a schematic view illustrating an embodiment of an LCS provisioning system that may provide the initialization information storage virtualization system of the present disclosure.

For example, with reference to FIG. 8, an embodiment of an LCS provisioning system 800 is illustrated that may provide the initialization information storage virtualization system of the present disclosure, and that is similar to the LCS provisioning system 700 (with similar elements provided with the same element numbers). As can be seen in FIG. 8, the LCS provisioning system 800 differs from the LCS providing system 700 via the use of a root subsystem 802 (e.g., a Peripheral Component Interconnect express (PCIe) root complex) to couple the BIOS boot controller 714 to the SCP engine 708 in the SCP device 706 (in addition to its connection to the SCP engine 708 via the SPI controller 716.) As will be appreciated by one of skill in the art in possession of the present disclosure, the embodiment introduced in FIG. 8 and discussed in further detail below allows the BIOS boot controller 714 in the processing system 712 to utilize a SPI connection to access a virtual Trusted Platform Module (vTPM) provided in the SCP device 706, while accessing a virtual Serial Peripheral Interface (vSPI) storage (or other virtualized BIOS storage) in the SCP device 706 using a non-SPI connection, and one of skill in the art in possession of the present disclosure will appreciate how such non-SPI connection communications may require the configuration of the BIS boot controller 714 using BIOS controller drivers that enable those non-SPI connection communications by the BIOS boot controller 714.

Figure 9:
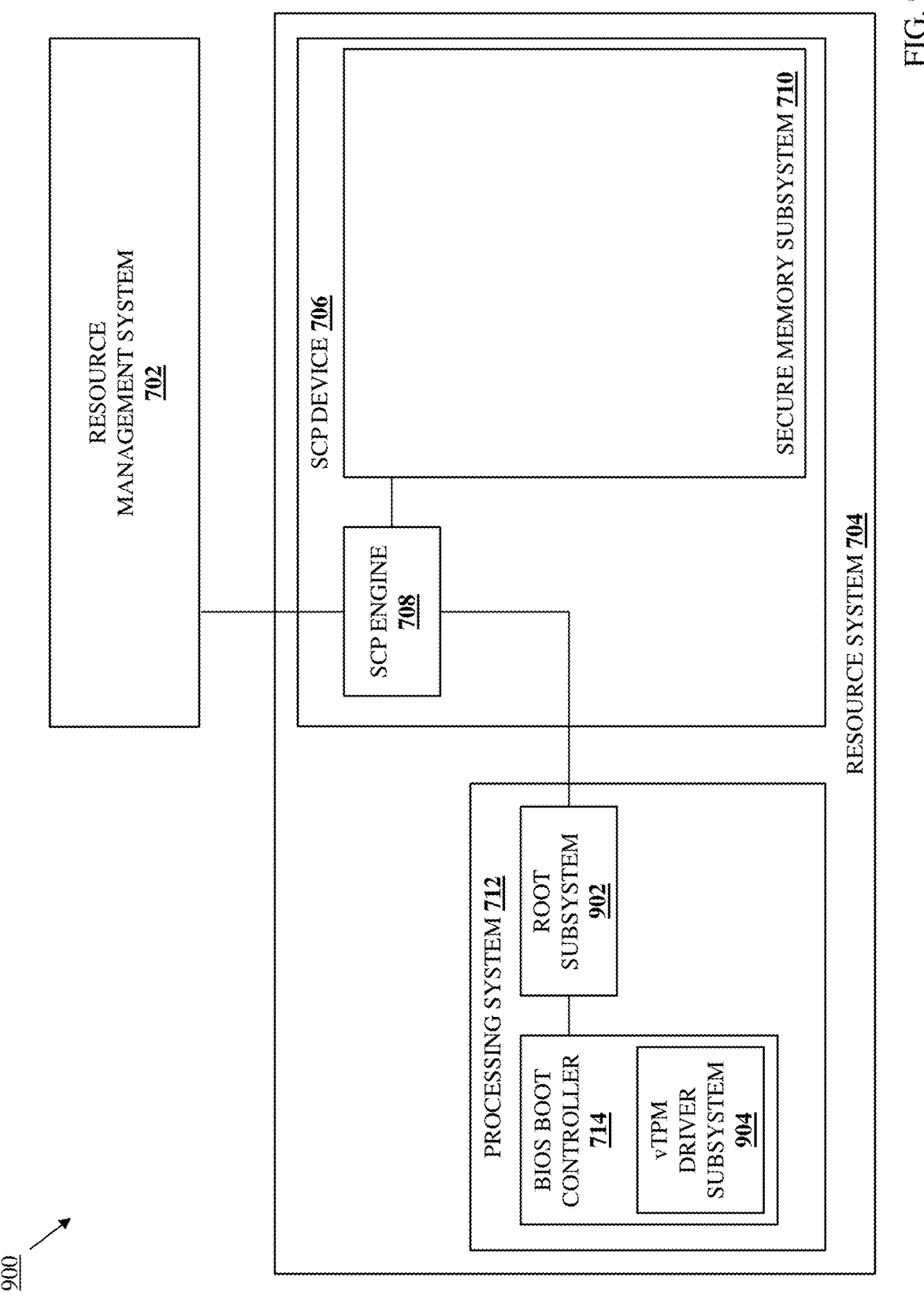
FIG. 9 is a schematic view illustrating an embodiment of an LCS provisioning system that may provide the initialization information storage virtualization system of the present disclosure.

In another example, with reference to FIG. 9, an embodiment of an LCS provisioning system 900 is illustrated that may provide the initialization information storage virtualization system of the present disclosure, and that is similar to the LCS provisioning system 700 (with similar elements provided with the same element numbers). As can be seen in FIG. 9, the LCS provisioning system 900 differs from the LCS providing system 700 via the use of a root subsystem 902 (e.g., a PCIe root complex) to couple the BIOS boot controller 714 to the SCP engine 708 in the SCP device 706, and the provisioning of a vTPM driver subsystem 904 in the BIOS boot controller 714 (e.g., a BIOS driver that supports vTPM natively, rather than via a SPI controller). As will be appreciated by one of skill in the art in possession of the present disclosure, the embodiment introduced in FIG. 9 and discussed in further detail below allows the processing system 712 to access a virtual Trusted Platform Module (vTPM) and a virtual Serial Peripheral Interface (vSPI) storage (or other virtualized BIOS storage) via the SCP device 706 without an SPI connection, and one of skill in the art in possession of the present disclosure will appreciate how native transport security built into NVMe may be leveraged via the vTPM driver subsystem 904 to access that vTPM securely. As such, one of skill in the art in possession of the present disclosure will appreciate how the initialization information storage virtualization functionality described below may be enabled in a variety of manners while remaining within the scope of the present disclosure.

Referring now to FIG. 10, an embodiment of a method 1000 for virtualizing storage for computing device initialization information is illustrated. As discussed below, the systems and methods of the present disclosure provide for the virtualization of storage for initialization information in a secure memory subsystem of an SCP device that is included in a resource system that initializes using that initialization information. For example, the initialization information storage virtualization system of the present disclosure may include a resource system that is coupled to a resource management system and that includes a processing system coupled to a System Control Processor (SCP) device. The SCP device creates a virtual initialization information storage and a virtual Trusted Platform Module (vTPM) in its secure memory subsystem. The SCP device then receives resource system initialization information and resource system initialization authentication information for the resource system from the resource management system, populates the virtual initialization information storage with the resource system initialization information, and populates the vTPM with the resource system initialization authentication information. When the SCP device receives an initialization information request from the processing system, the SCP device provides the resource system initialization information and the resource system initialization authentication information to the processing system.

As discussed below, the virtualization of the initialization information storage in the secure memory subsystem of the SCP device (as well as other uses of the secure memory subsystem) provides several benefits over the use of conventional physical BIOS SPI flash memory devices and TPM devices including, for example, allowing any particular resource system to be provided with a single image instance that includes all of the attributes of that resource system in its SCP device (rather than in different locations), deploying any instance of initialization information for a resource system according to policies, simplifying the prevention of the use of untrusted initialization information with resource systems, deploying initialization variables (e.g., BIOS boot variables) for a resource device as instructed directly via a control plane, enabling "complete" resource system lockdown, and/or other benefits that would be apparent to one of skill in the art in possession of the present disclosure.

Figure 11A:
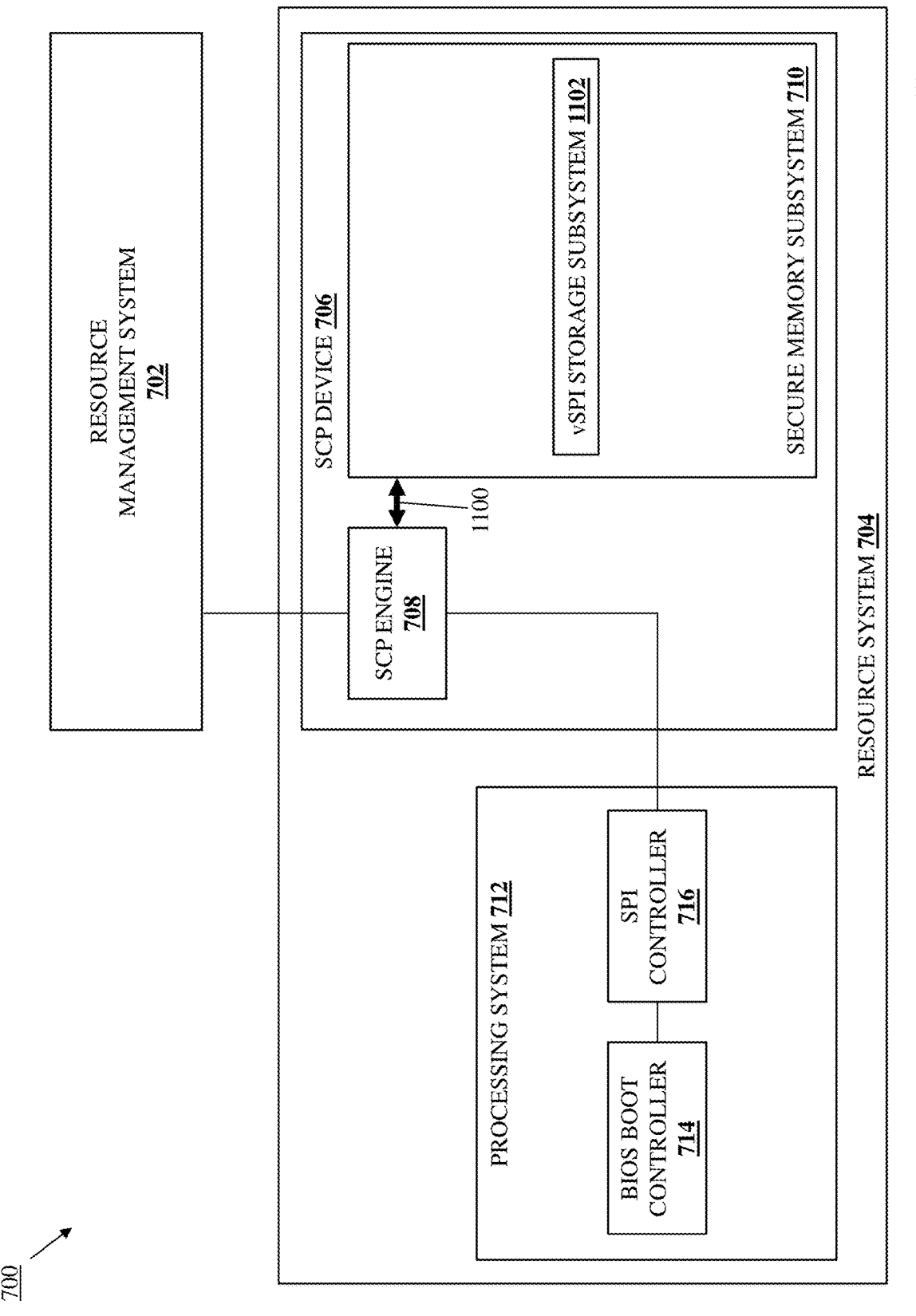
FIG. 11A is a schematic view illustrating an embodiment of the LCS provisioning system of FIG. 7 operating during the method of FIG. 10.
Figure 11B:
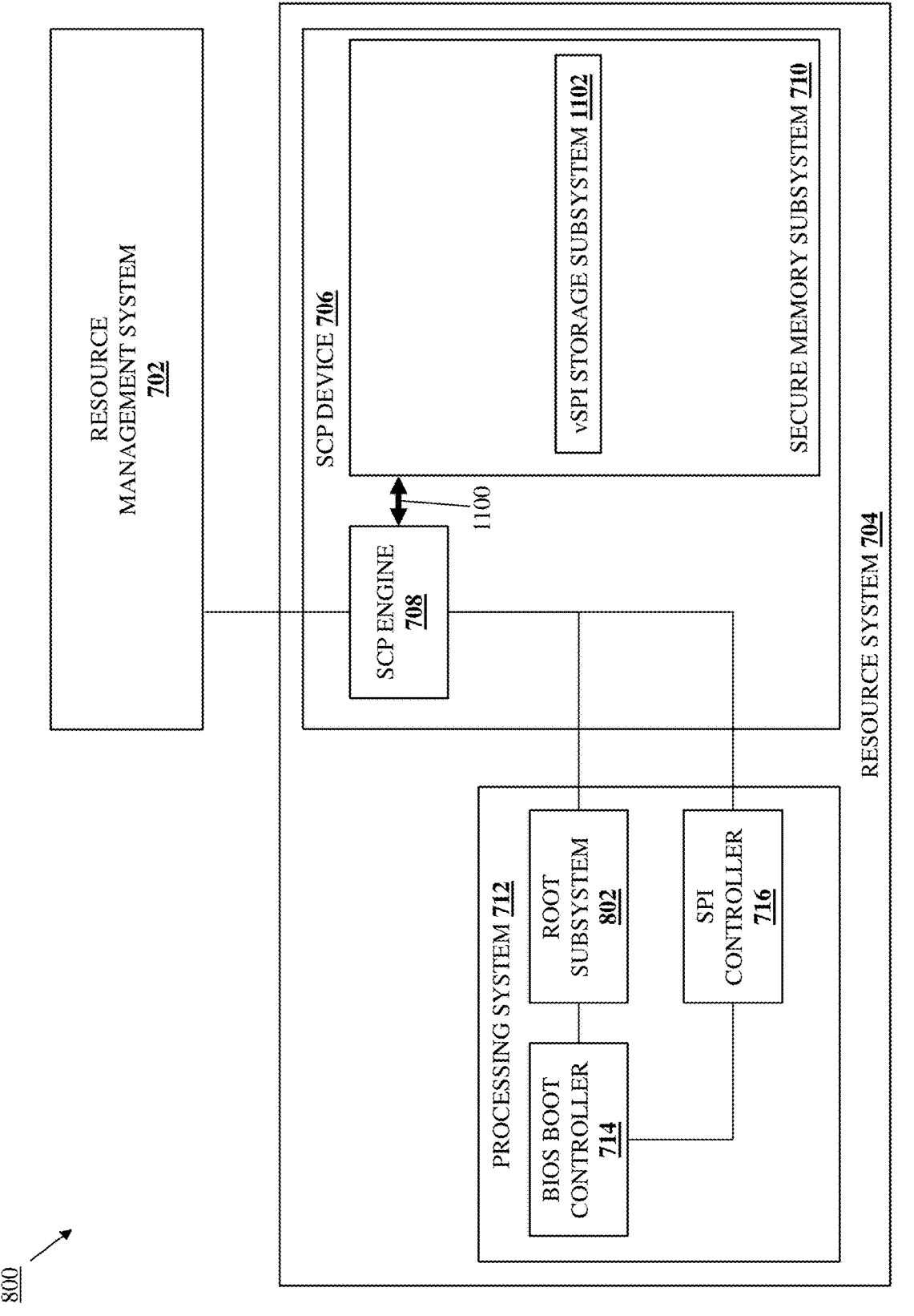
FIG. 11B is a schematic view illustrating an embodiment of the LCS provisioning system of FIG. 8 operating during the method of FIG. 10.
Figure 11C:
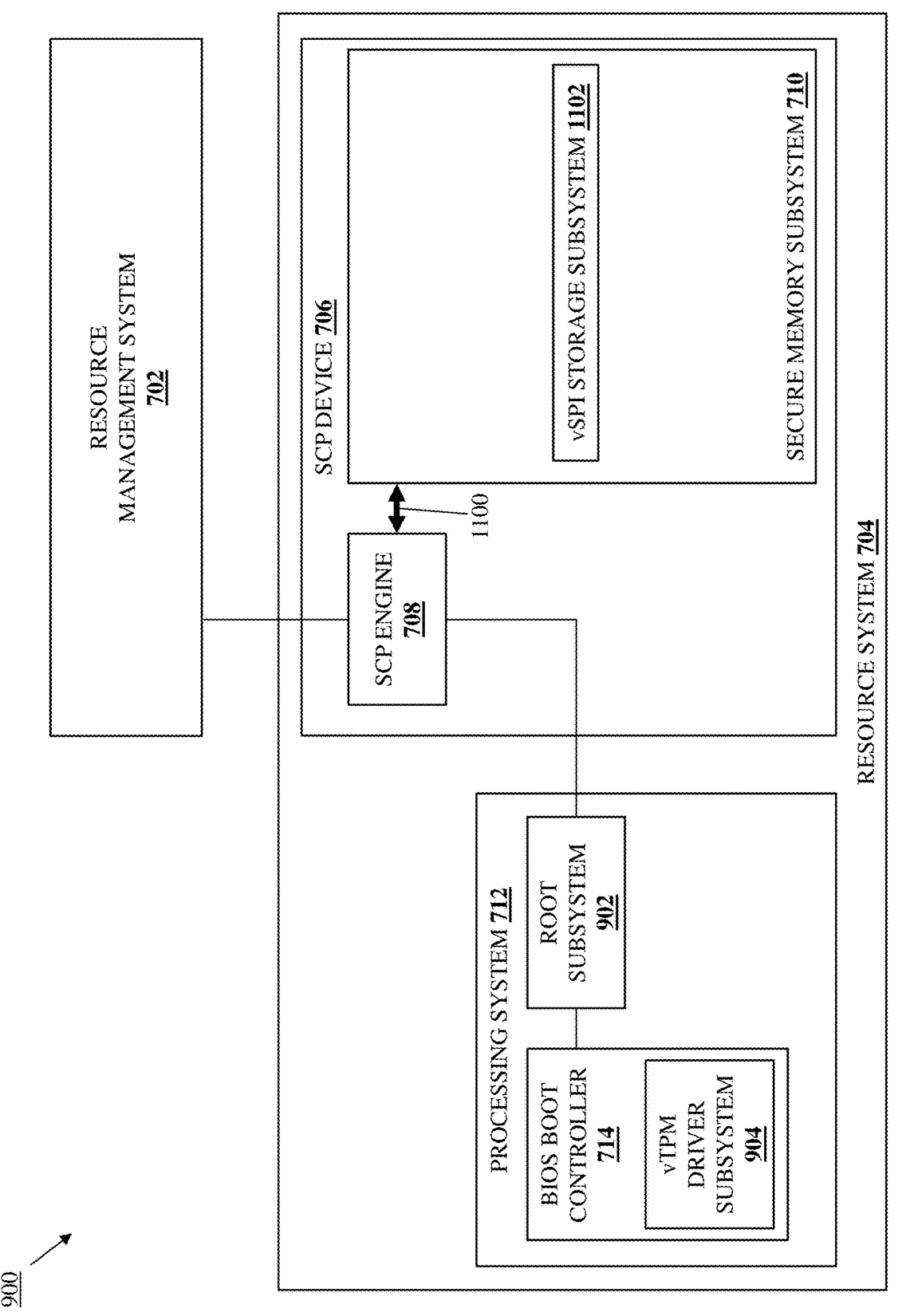
FIG. 11C is a schematic view illustrating an embodiment of the LCS provisioning system of FIG. 9 operating during the method of FIG. 10.

The method 1000 begins at block 1002 where an SCP device in a resource system creates a virtual initialization information storage in its secure memory subsystem. With reference to FIGS. 11A, 11B, and 11C, in an embodiment of block 1002, the SCP engine 708 in the SCP device 706 included in the resource system 704 of any of the LCS provisioning systems 700, 800, and 900 may perform initialization information storage creation operations 1100 that, in the illustrated embodiments, include creating a virtual Serial Peripheral Interface (vSPI) storage subsystem 1102 (e.g., a vSPI BIOS flash memory space) in the secure memory subsystem 710 of the SCP device 706. For example, the creation of the vSPI storage subsystem 1102 may include emulating a storage space (e.g., an NVMe storage space), configuring that storage space with regions for boot code, optional drivers, configuration information, etc., and/or performing other storage virtualization operations that would be apparent to one of skill in the art in possession of the present disclosure.

As discussed above, the deployment of the vSPI storage subsystem 1102 by the SCP engine 708 in the SCP device 706 may be based on one or more policies, allowing the SCP engine 708 to restrict the drivers and/or other contents that may be stored in the vSPI storage subsystem 1102 based on any of those policies (e.g., only images, drivers, and/or other contents that are trusted by the control plane provided by the resource management system 702 and the SCP device 706 may be stored in the vSPI storage subsystem 1102 by the SCP engine 708). Furthermore, while the virtual initialization information storage is illustrated and described as being provided by a vSPI storage subsystem, one of skill in the art in possession of the present disclosure will appreciate how other initialization information storage may be virtualized at block 1002 while remaining within the scope of the present disclosure as well.

Figure 12A:
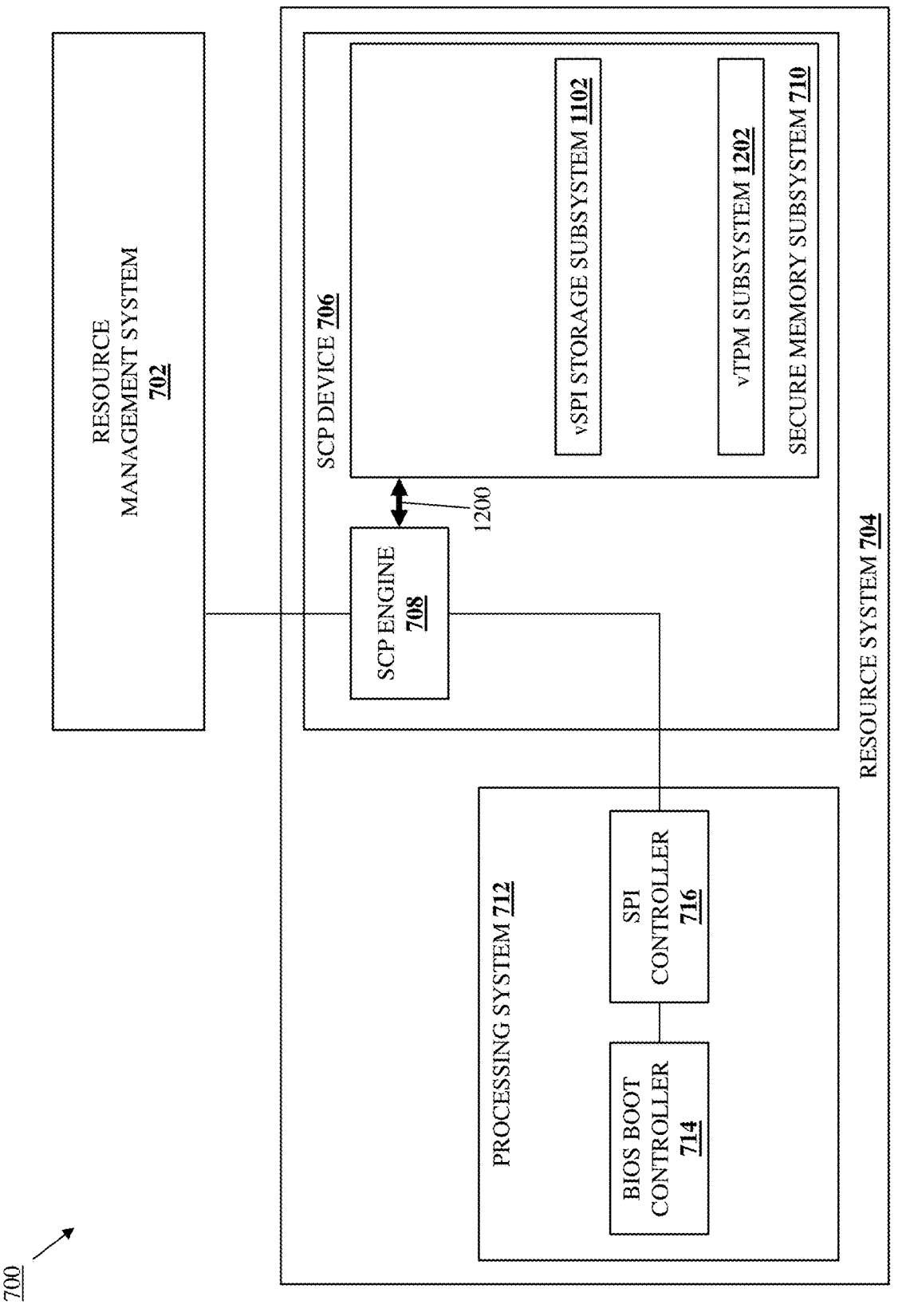
FIG. 12A is a schematic view illustrating an embodiment of the LCS provisioning system of FIG. 7 operating during the method of FIG. 10.
Figure 12B:
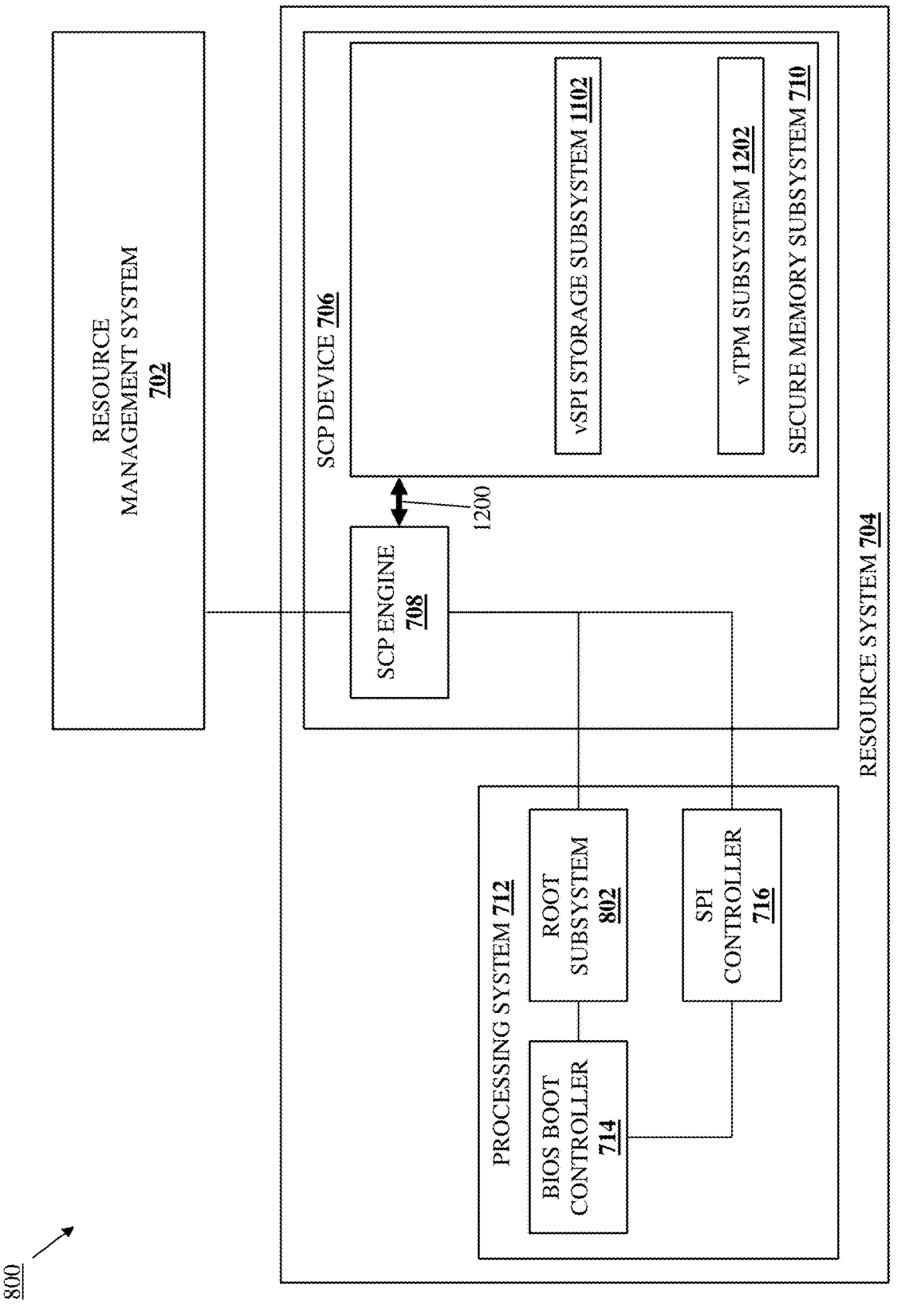
FIG. 12B is a schematic view illustrating an embodiment of the LCS provisioning system of FIG. 8 operating during the method of FIG. 10.
Figure 12C:
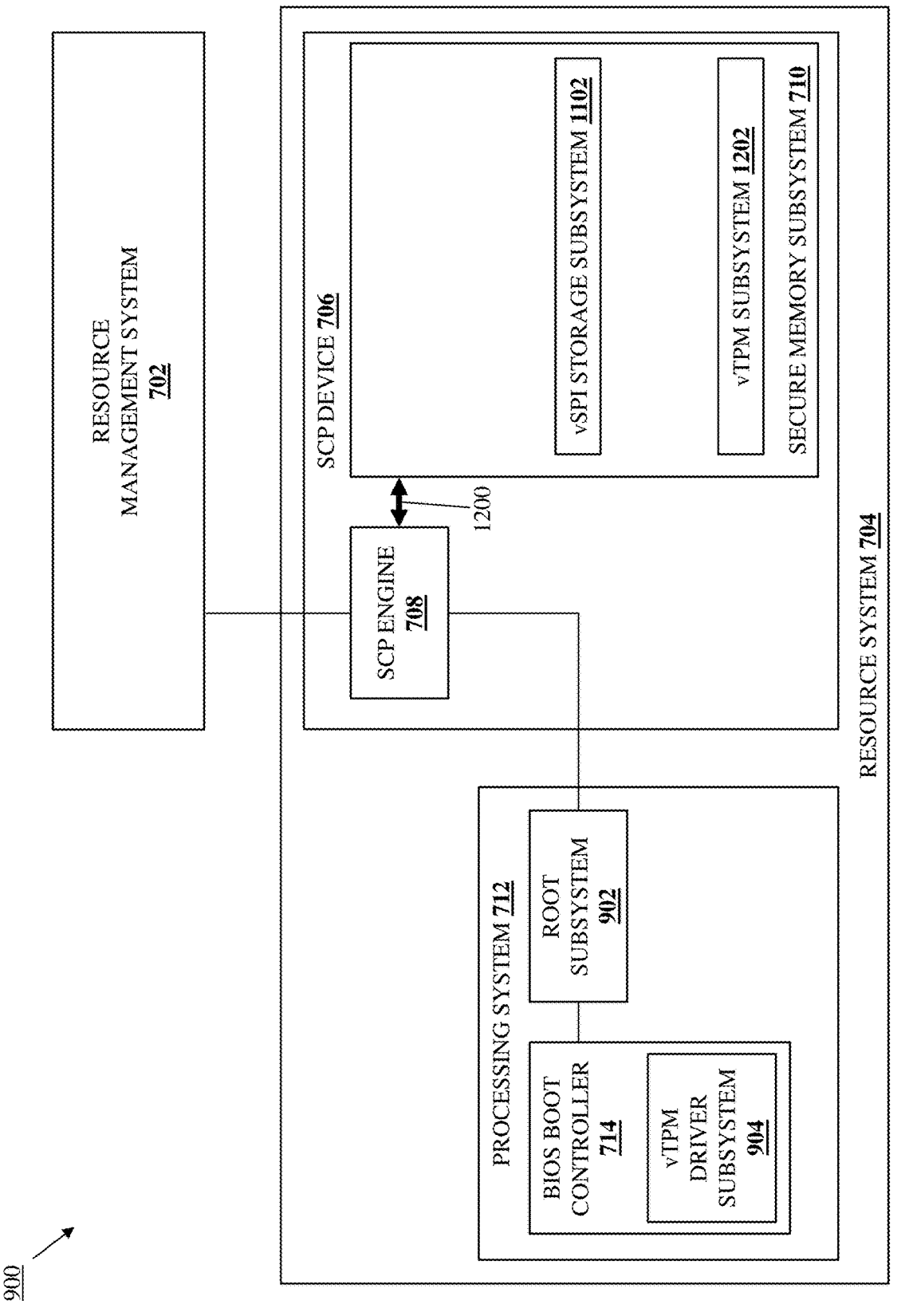
FIG. 12C is a schematic view illustrating an embodiment of the LCS provisioning system of FIG. 9 operating during the method of FIG. 10.

The method 1000 then proceeds to block 1004 where the SCP device creates a vTPM in its secure memory subsystem. With reference to FIGS. 12A, 12B, and 12C, in an embodiment of block 1004, the SCP engine 708 in the SCP device 706 included in the resource system 704 of any of the LCS provisioning systems 700, 800, and 900 may perform vTPM creation operations 1200 that, in the illustrated embodiments, include creating a virtual Trusted Platform Module (vTPM) subsystem 1202 (e.g., a virtual SPI Trusted Platform Module in the LCS provisioning systems 700 and 800, or a vTPM in the LCS provisioning systems 900) in the secure memory subsystem 710 of the SCP device 706. For example, the creation of the vTPM subsystem 1202 may include emulating a vTPM interface, enabling engines that respond to TPM requests (e.g., encryption requests), populating register values, and/or performing other vTPM creation operations that would be apparent to one of skill in the art in possession of the present disclosure. As will be appreciated by one of skill in the art in possession of the present disclosure, the systems of the present disclosure replace physical TPM devices provided in conventional resource systems with the vTPM subsystem 1202 that includes a vTPM that is an extension of the control plane provided by the resource management system 702 and the SCP device 706. Furthermore, while the vTPM is illustrated and described as being provided for use in storing the initialization authentication information discussed below, one of skill in the art in possession of the present disclosure will appreciate other initialization authentication information storage may be virtualized at block 1004 while remaining within the scope of the present disclosure as well.

Figure 13A:
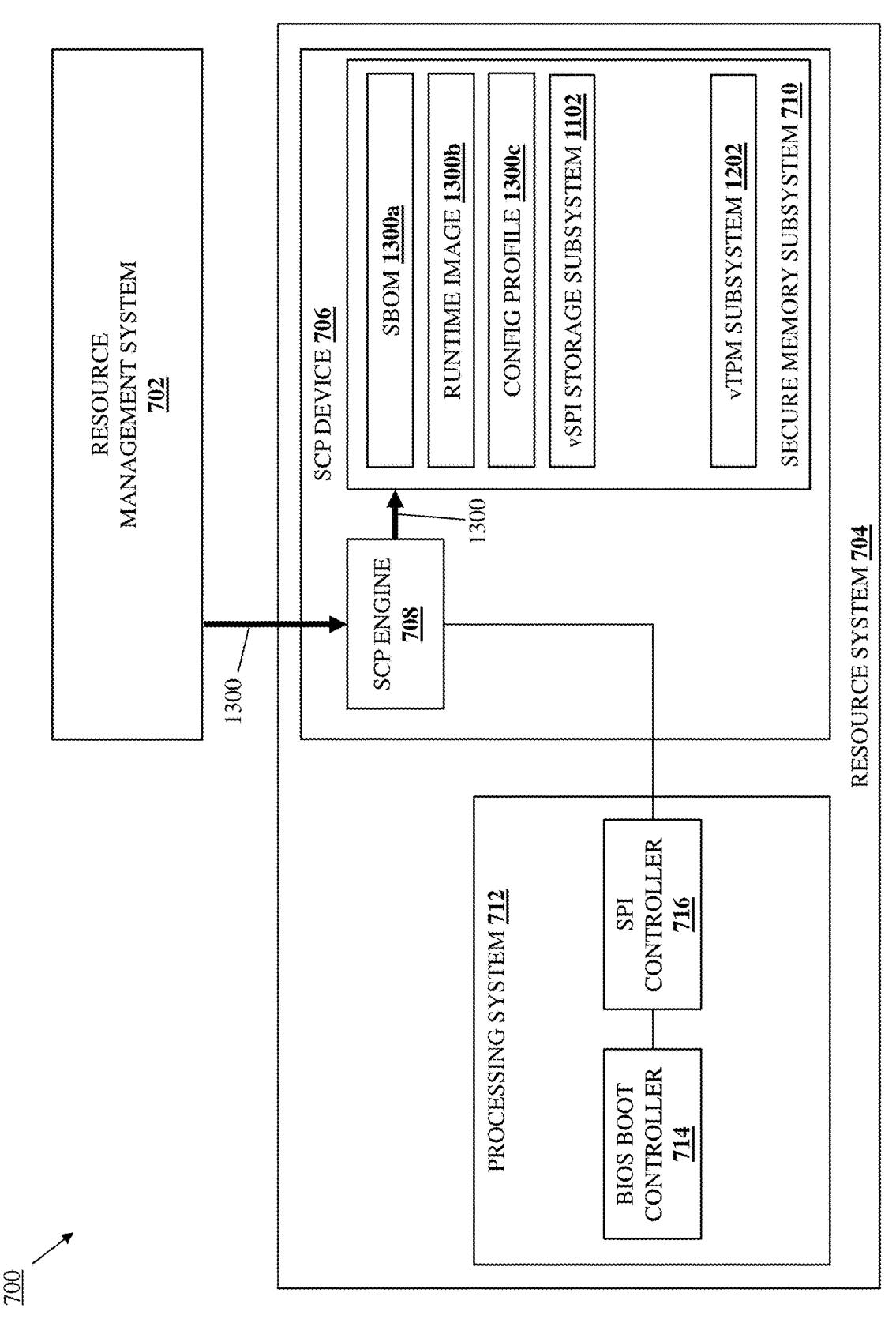
FIG. 13A is a schematic view illustrating an embodiment of the LCS provisioning system of FIG. 7 operating during the method of FIG. 10.
Figure 13B:
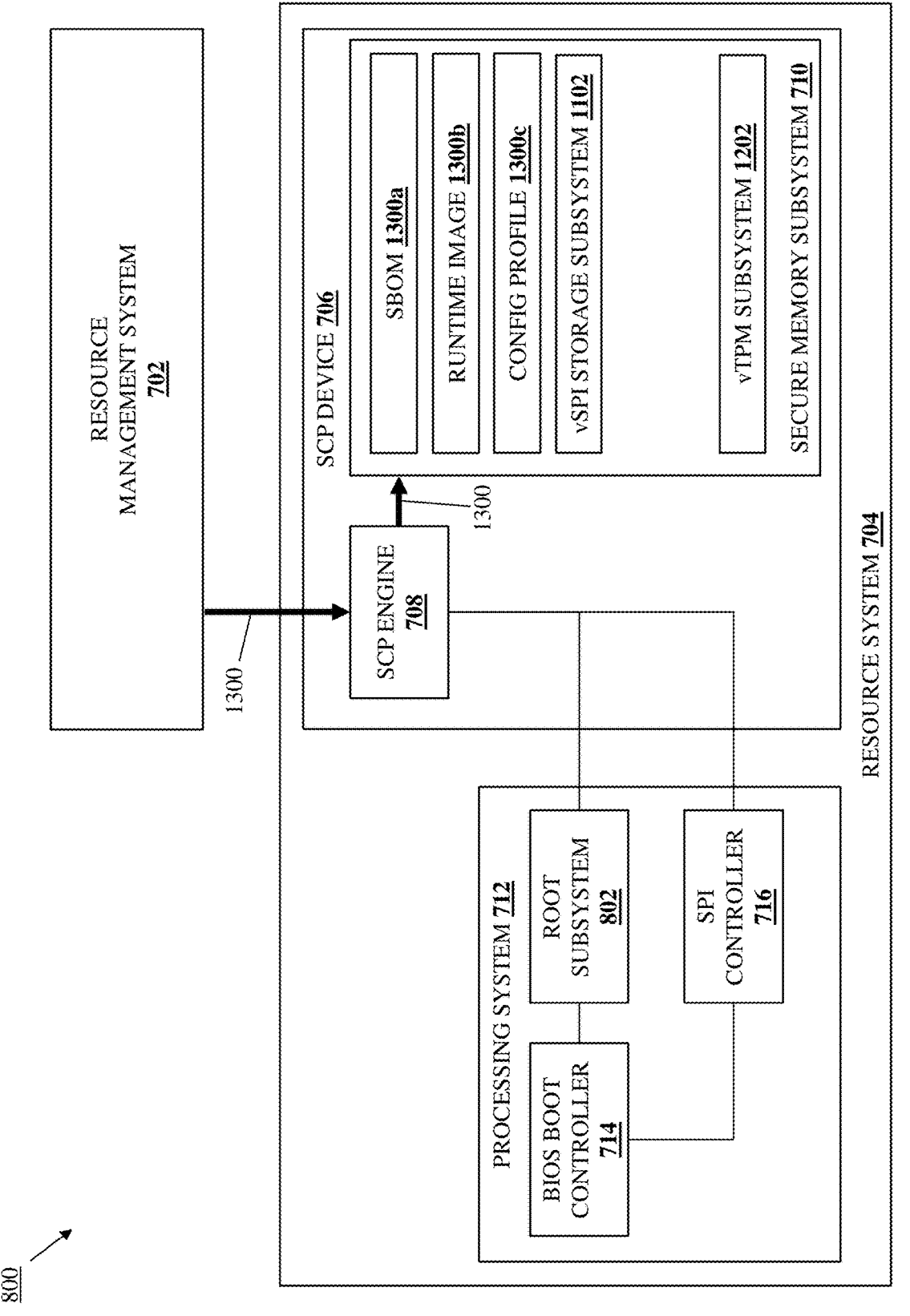
FIG. 13B is a schematic view illustrating an embodiment of the LCS provisioning system of FIG. 8 operating during the method of FIG. 10.
Figure 13C:
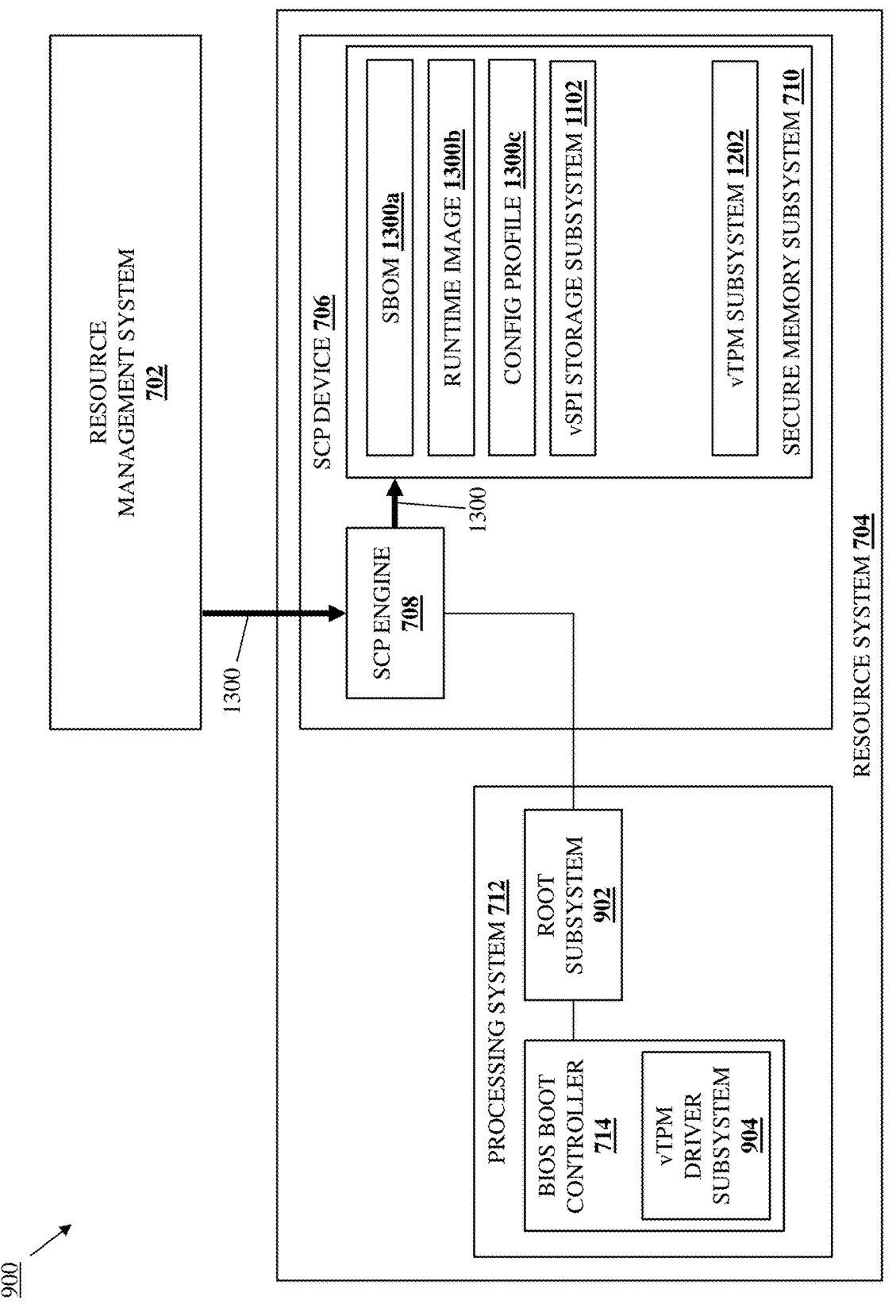
FIG. 13C is a schematic view illustrating an embodiment of the LCS provisioning system of FIG. 9 operating during the method of FIG. 10.

The method 1000 then proceeds to block 1006 where the SCP device receives resource system initialization information and resource system initialization authentication information from the resource management system, populates the virtual initialization information storage with the resource system initialization information, and populates the vTPM with the resource system initialization authentication information. With reference to FIGS. 13A, 13B, and 13C, in an embodiment of block 1006, the SCP engine 708 in the SCP device 706 included in the resource system 704 of any of the LCS provisioning systems 700, 800, and 900 may perform resource system information receiving and storage operations 1300 that, in the illustrated embodiments, include receiving resource system information for the resource system 704 from the resource management system 702, and storing that resource system information in the secure memory subsystem 710 of the SCP device 706.

In the illustrated embodiment, the resource system information received and stored at block 1006 includes a Software Bill Of Materials (SBOM) 1300a that identifies software resources that are available in the resource system 704, a runtime image 1300b for the resource system 704 (e.g., a Bare Metal Server (BMS) runtime image for providing an operating system in a BMS that provides the resource system 704), and a configuration profile 1300c for the resource system 704 (e.g., a BMS hardware/firmware configuration profile that includes configuration information for configuring hardware and firmware in a BMS that provides the resource system 704), although one of skill in the art in possession of the present disclosure will appreciate how the resource system information may include any of a variety of information that may be used to configure the resource system 704 to operates as described herein.

As noted above, the resource system information for the resource system 704 may be provided in a single image instance in the secure memory subsystem 710 of the SCP device 706, with that single image instance including all of the attributes of the resource system 704 (e.g., its SBOM, runtime image, configuration profile, etc.), rather than having those attributes stored in different locations on different subsystems as is done in conventional LCS provisioning systems. Furthermore, the provisioning of the resource system information as described above provides more control over the SBOM at the time of its composition, as the resource management system 702 may set the SBOM values on demand. However, while a specific benefit of the provisioning of the resource system information as described above has been provided, one of skill in the art in possession of the present disclosure will appreciate how other benefits (e.g., the resource management system 702 ensuring that up-to-date firmware is used with the resource system 704) may be realized as well.

Figure 14A:
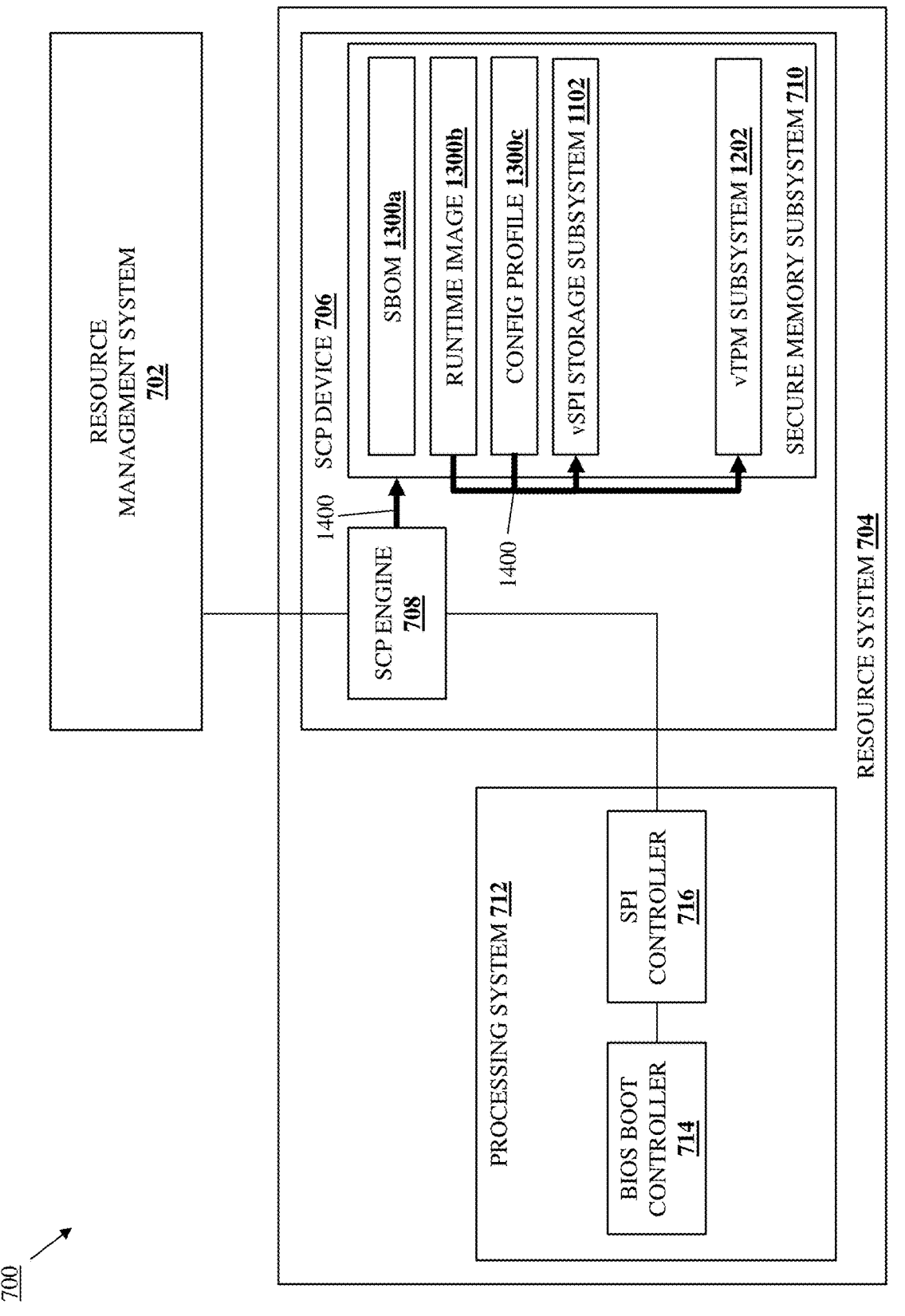
FIG. 14A is a schematic view illustrating an embodiment of the LCS provisioning system of FIG. 7 operating during the method of FIG. 10.
Figure 14B:
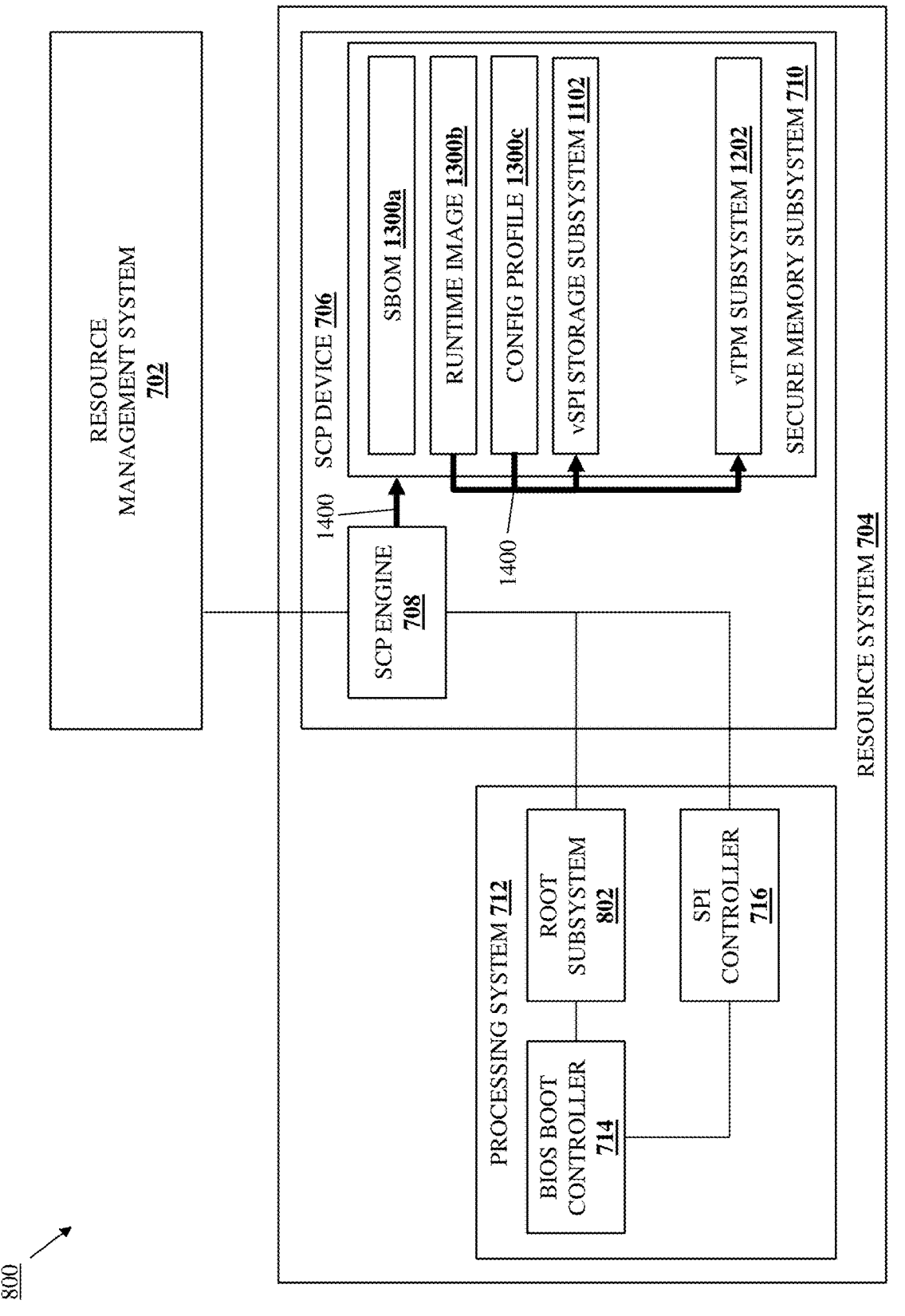
FIG. 14B is a schematic view illustrating an embodiment of the LCS provisioning system of FIG. 8 operating during the method of FIG. 10.
Figure 14C:
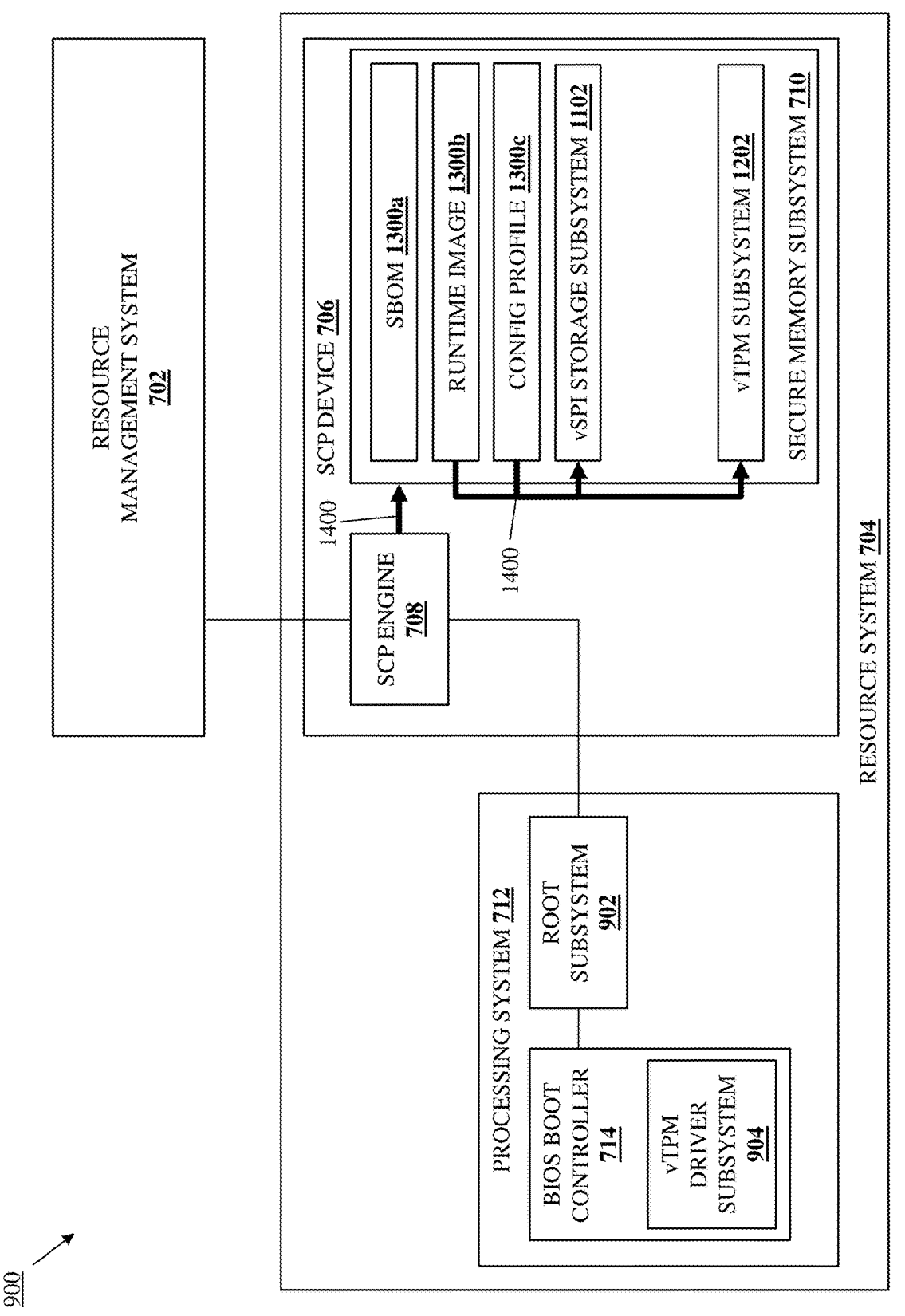
FIG. 14C is a schematic view illustrating an embodiment of the LCS provisioning system of FIG. 9 operating during the method of FIG. 10.

With reference to FIGS. 14A, 14B, and 14C, in an embodiment of block 1008, the SCP engine 708 in the SCP device 706 included in the resource system 704 of any of the LCS provisioning systems 700, 800, and 900 may then perform resource system initialization information storage operations 1400 that, in the illustrated embodiments, include copying subsets of the runtime image 1300b and the configuration profile 1300c that provide resource system initialization information to the vSPI storage subsystem 1102, and using subsets of the runtime image 1300b and the configuration profile 1300c to generate resource system initialization authentication information and providing that resource system initialization authentication information in the vTPM subsystem 1202.

To provide a specific example, the runtime image 1300b for the resource system 704 may include resource system initialization information such as, for example, executable names, signing data, operating system information, and/or other initialization information known in the art, while the configuration profile 1300c may include resource system initialization information such as BIOS boot variables, strings identifying resource system information, and/or other initialization information known in the art, and that resource system initialization information may be copied to the vSPI storage subsystem 1102 for use by the BIOS boot controller 714 in the processing system 712 of the resource system 704 in initializing the resource system 704 as described in further detail below. As discussed above, the SCP engine 708 may operate to restrict the drivers and/or other contents that may be stored in the vSPI storage subsystem 1102 based on any of a variety of policies (e.g., only trusted drivers and/or other contents may be stored in the vSPI storage subsystem 1102 by the SCP engine 708). For example, a policy may be implemented by the SPI engine 708 to deactivate Universal Serial Bus (USB) ports (or otherwise prevent storage devices from accessing data stored in the resource system 704 by being connected thereto) by preventing USB drivers from being stored in the vSPI storage subsystem 1102.

As such, resource system initialization information like the BIOS boot variables discussed above and/or other resource system feature sets may be provided directly from the control plane provided by the resource management system 702 and the SCP device 706, eliminating the need for synchronization operations that are required in conventional resource systems. For example, conventional resource systems require a runtime agent with an API in order to retrieve and synchronize BIOS boot variables with the host processing system, and with those BIOS boot variables stored in the SCP device 706 of the present disclosure, the processing system 712 may simply access and use them from the SCP device 706.

Similarly, the runtime image 1300b for the resource system 704 may include information that may be used to generate resource system initialization authentication information such as boot image drivers, optional data, and/or other resource system initialization authentication information known in the art, while the configuration profile 1300c may include information that may be used to generate resource system initialization authentication information such as security keys, system variables, resource system initialization authentication information known in the art, and that resource system initialization authentication information may be provided in the vTPM subsystem 1202 for use by the BIOS boot controller 714 in the processing system 712 of the resource system 704 in authenticating the initialization of the resource system 704 as described in further detail below.

Figure 15A:
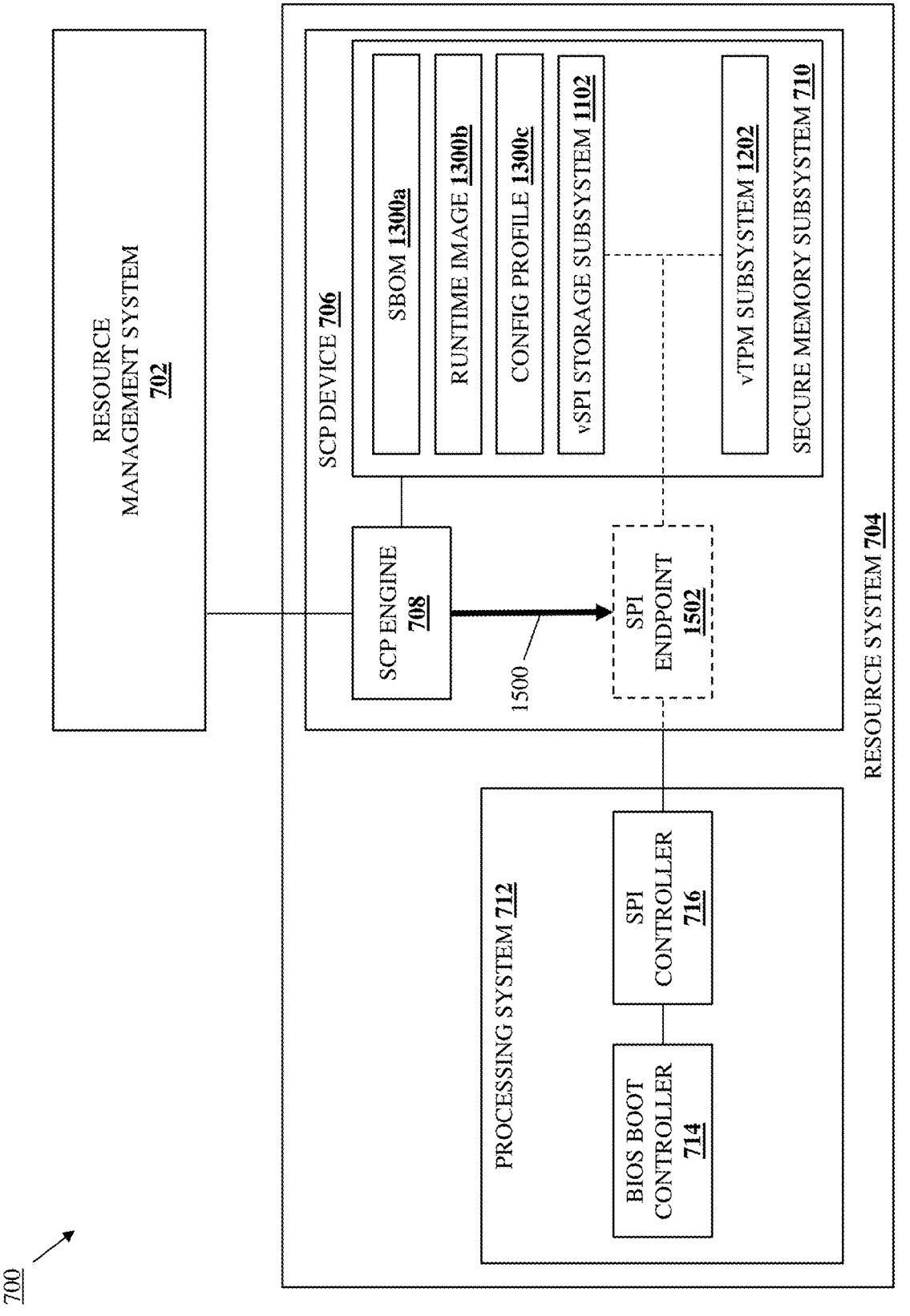
FIG. 15A is a schematic view illustrating an embodiment of the LCS provisioning system of FIG. 7 operating during the method of FIG. 10.

With reference to FIG. 15A and the embodiment of the LCS provisioning system 700 of FIG. 7 introduced above, following block 1006 the SCP engine 708 in the SCP device 706 of the resource system 704 may perform SPI endpoint provisioning operations 1500 that include providing a SPI endpoint 1502 by using a physical SPI controller or emulating a virtual SPI controller on a SPI bus, and/or using other endpoint provisioning techniques that would be apparent to one of skill in the art in possession of the present disclosure. As will be appreciated by one of skill in the art in possession of the present disclosure, the SPI endpoint 1502 may be configured with security functionality in order to allow it to securely access the vTPM subsystem 1202. As can be seen, from the point of view of the SPI controller 716 in the processing system 712 of the resource system 704, the SPI endpoint 1502 is accessible via the SPI connection between the processing system 712 and the SCP device 706 and includes direct access to the vSPI storage subsystem 1102 and the vTPM subsystem 1202 provided in the secure memory subsystem 710 in the SCP device 706, thus providing the BIOS boot controller 714 in the processing system 712 access to the vSPI storage subsystem 1102 and the vTPM subsystem 1202 via the SPI connection between the processing system 712 and the SCP device 706.

Figure 15B:
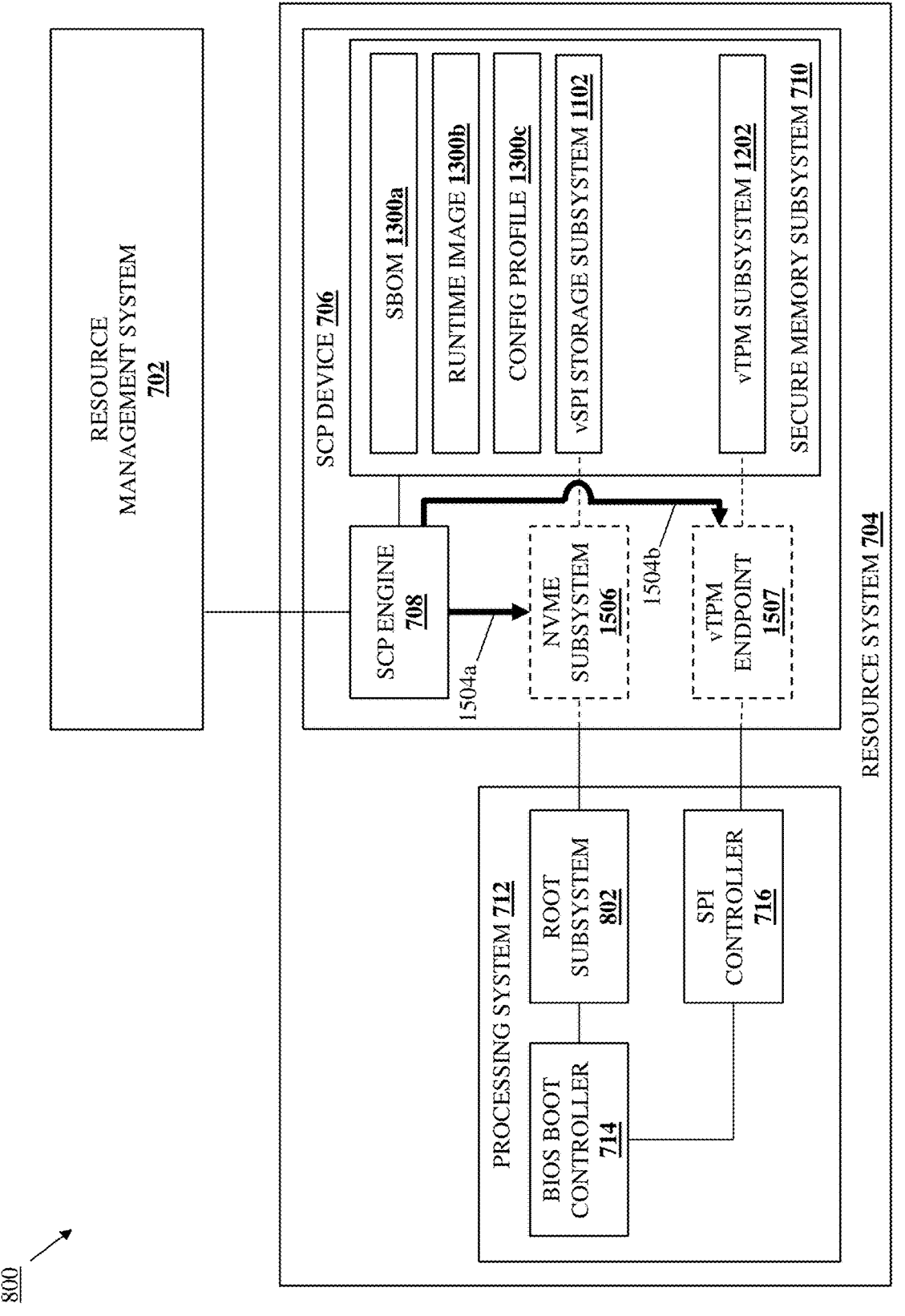
FIG. 15B is a schematic view illustrating an embodiment of the LCS provisioning system of FIG. 8 operating during the method of FIG. 10.

With reference to FIG. 15B and the embodiment of the LCS provisioning system 800 of FIG. 8 introduced above, following block 1006 the SCP engine 708 in the SCP device 706 of the resource system 704 may perform Non-Volatile Memory express (NVMe) subsystem provisioning operations 1504a that include providing an NVMe subsystem 1506 by using a physical NVMe subsystem or emulating a virtual NVMe subsystem on a PCIe bus or NVMe fabric, and/or using other NVMe subsystem provisioning techniques that would be apparent to one of skill in the art in possession of the present disclosure. For example, the NVMe subsystem 1506 may include a Peripheral Component Interconnect express (PCIe) NVMe target, an NVMe boot controller, an NVMe BIOS boot partition, and/or other NVMe components that would be apparent to one of skill in the art in possession of the present disclosure. In addition, the SCP engine 708 in the SCP device 706 of the resource system 704 may perform vTPM endpoint provisioning operations 1504b that include providing a vTPM endpoint 1507 by emulating a TPM on a bus connected to the secure memory subsystem 710, and/or using other endpoint provisioning techniques that would be apparent to one of skill in the art in possession of the present disclosure.

As will be appreciated by one of skill in the art in possession of the present disclosure, the use of an NVMe BIOS boot partition in the SCP device 706 with the vSPI storage subsystem 1102 provides flexibility with regard to the size of BIOS images that may be stored, the presentation of such BIOS images, as well as other benefits that will be apparent to one of skill in the art in possession of the present disclosure. For example, one of skill in the art will appreciate that a physical SPI storage device provides a relatively small storage space, while an NVMe interface and corresponding emulated NVMe storage used to provide the vSPI storage subsystem 1102 may be dynamically sized to meet the needs of BIOS images of any size. However, while an NVMe subsystem is illustrated and described, one of skill in the art in possession of the present disclosure will appreciate how other storage subsystems may be provided in place of the NVMe subsystem 1506 discussed below while remaining within the scope of the present disclosure as well.

As can be seen, from the point of view of the root subsystem 802 in the processing system 712 of the resource system 704, the NVMe subsystem 1506 is accessible via its connection (e.g., a non-SPI connection) between the processing system 712 and the SCP device 706 and includes direct access to the vSPI storage subsystem 1102 provided in the secure memory subsystem 710 in the SCP device 706, thus providing the BIOS boot controller 714 in the processing system 712 access to the vSPI storage subsystem 1102 via a non-SPI connection between the processing system 712 and the SCP device 706. Furthermore, from the point of view of the SPI controller in the processing system 712 of the resource system 704, the vTPM endpoint 1507 is accessible via its SPI connection between the processing system 712 and the SCP device 706 and includes direct access to the vTPM subsystem 1202 provided in the secure memory subsystem 710 in the SCP device 706, thus providing the BIOS boot controller 714 in the processing system 712 access to the vTPM subsystem 1202 via a SPI connection between the processing system 712 and the SCP device 706.

Figure 15C:
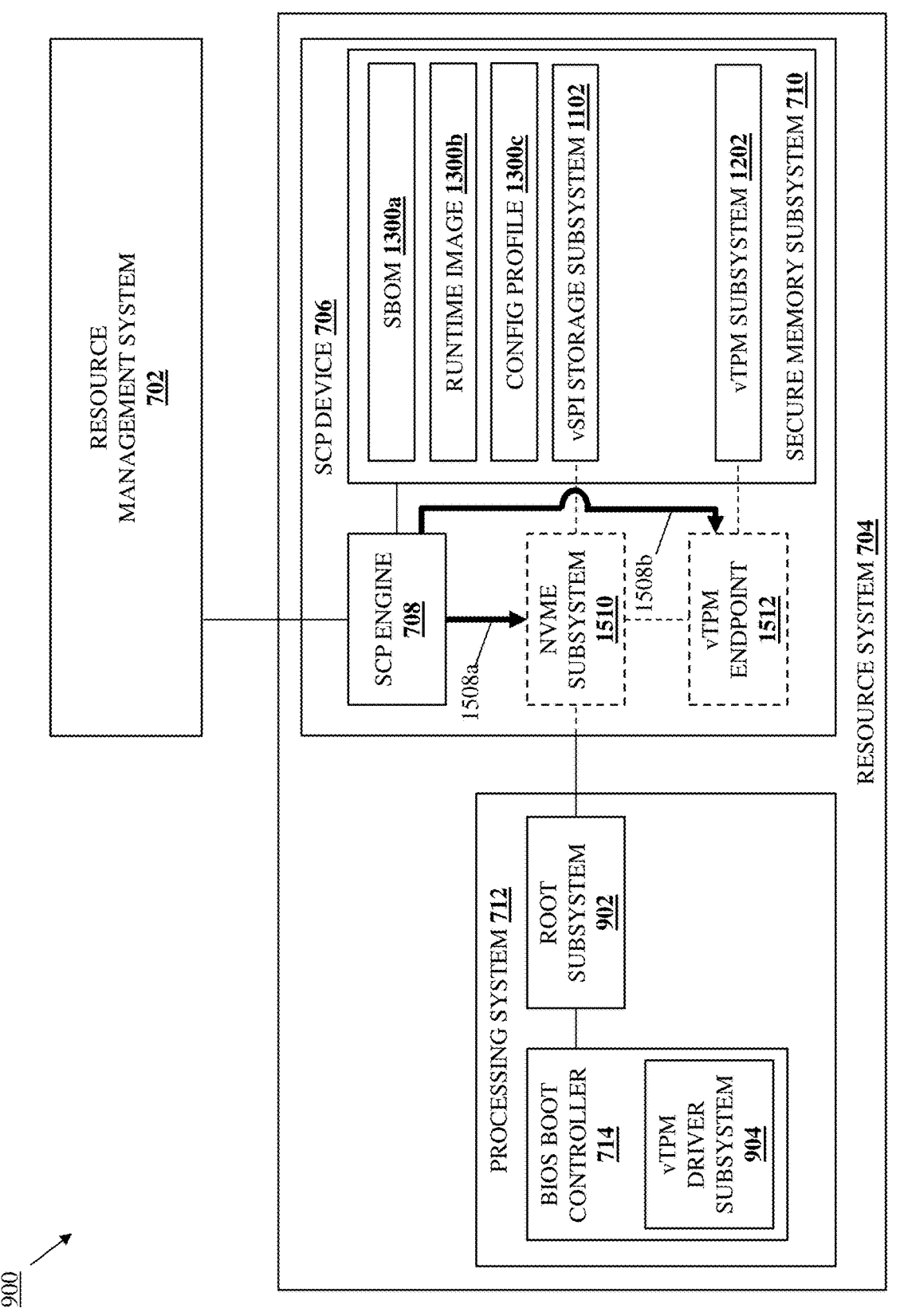
FIG. 15C is a schematic view illustrating an embodiment of the LCS provisioning system of FIG. 9 operating during the method of FIG. 10.

With reference to FIG. 15C and the embodiment of the LCS provisioning system 900 of FIG. 9 introduced above, following block 1006 the SCP engine 708 in the SCP device 706 of the resource system 704 may perform Non-Volatile Memory express (NVMe) subsystem provisioning operations 1508a that include providing an NVMe subsystem 1510 similarly as described above with respect to the NVMe subsystem 1506, and may perform vTPM endpoint provisioning operations 1508b that include providing a vTPM endpoint 1512 by emulating a TPM on a bus connected to the secure memory subsystem 710, and/or using other endpoint provisioning techniques that would be apparent to one of skill in the art in possession of the present disclosure.

As can be seen, from the point of view of the root subsystem 902 in the processing system 712 of the resource system 704, the NVMe subsystem 1510 is accessible via its connection (e.g., a non-SPI connection) between the processing system 712 and the SCP device 706 and includes direct access to the vSPI storage subsystem 1102 provided in the secure memory subsystem 710 in the SCP device 706, and the vTPM endpoint 1512 is accessible via the NVMe subsystem 1510 and includes direct access to the vTPM subsystem 1202 provided in the secure memory subsystem 710 in the SCP device 706, thus providing the BIOS boot controller 714 in the processing system 712 access to the vSPI storage subsystem 1102 and the vTPM subsystem 1202 via a non-SPI connection between the processing system 712 and the SCP device 706. As will be appreciated by one of skill in the art in possession of the present disclosure, configurations like that illustrated for the LCS provisioning system 900 eliminate the need to provide a respective SCP device for each processing system in a resource system, and rather allow a single SCP device to support multiple processing systems using a variety of fabric-based encrypted communication techniques (e.g., tunneling).

Figure 16A:
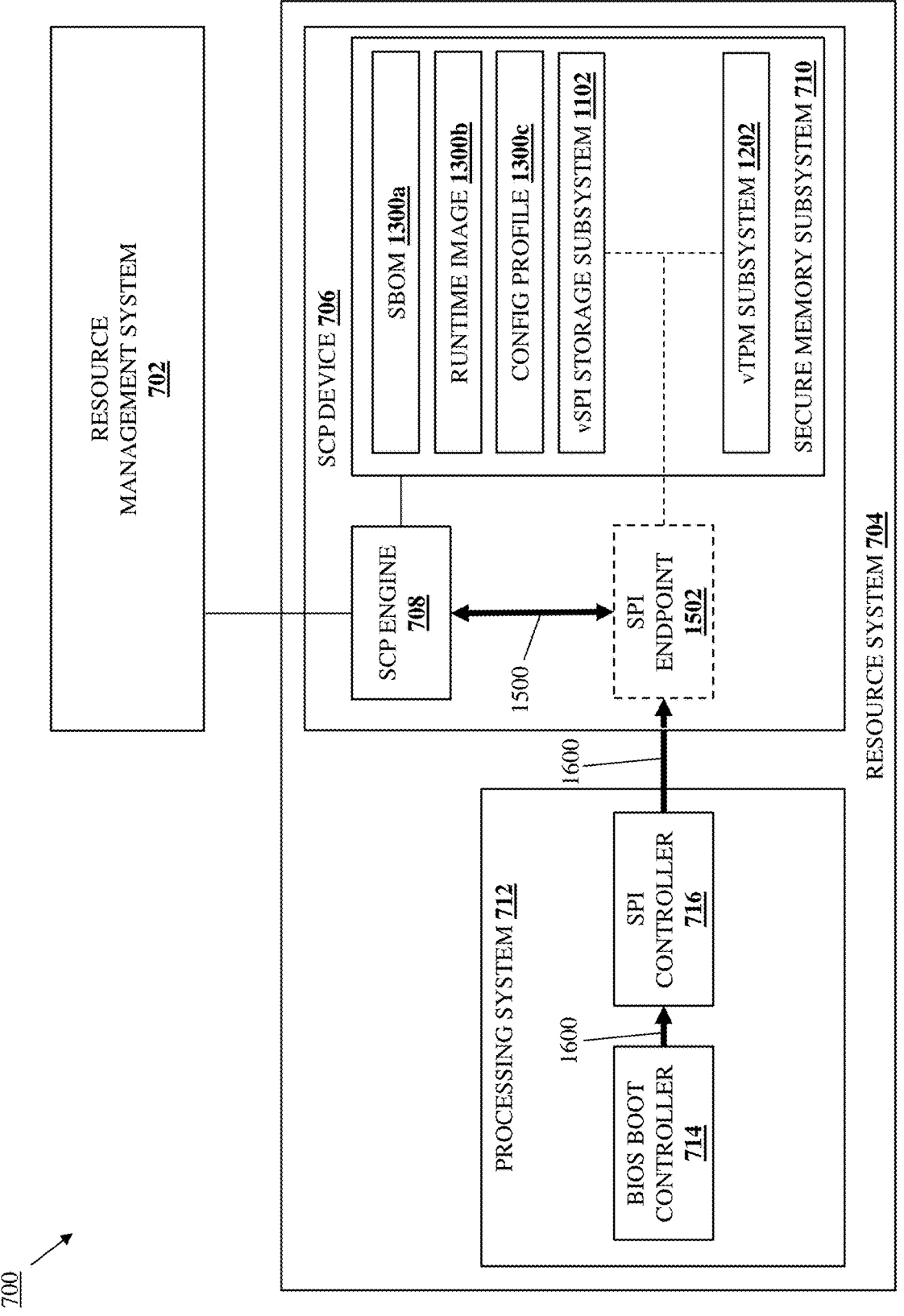
FIG. 16A is a schematic view illustrating an embodiment of the LCS provisioning system of FIG. 7 operating during the method of FIG. 10.

The method 1000 then proceeds to block 1008 where the SCP device receives an initialization information request from a processing system in the resource system. With reference to FIG. 16A, in an embodiment of block 1008, the BIOS boot controller 714 in the processing system 712 of the resource system 704 may perform initialization information request operations 1600 that include generating an initialization information request and transmitting the initialization information request via the SPI controller 716 in the processing system 712 and to the SPI endpoint 1502 provided by the SCP engine 708 (i.e., via the SPI endpoint provisioning operations 1500 discussed above). As will be appreciated by one of skill in the art in possession of the present disclosure, as part of initialization operations for the resource system 704 (e.g., to provide an operating system on the resource system 704 using the processing system 712), the BIOS boot controller 714 may use the initialization information request to request resource system initialization information for use in performing those initialization operations, resource system initialization authentication information for authenticating those initialization operations, and/or any other resource system initialization information that would be apparent to one of skill in the art in possession of the present disclosure.

Figure 17A:
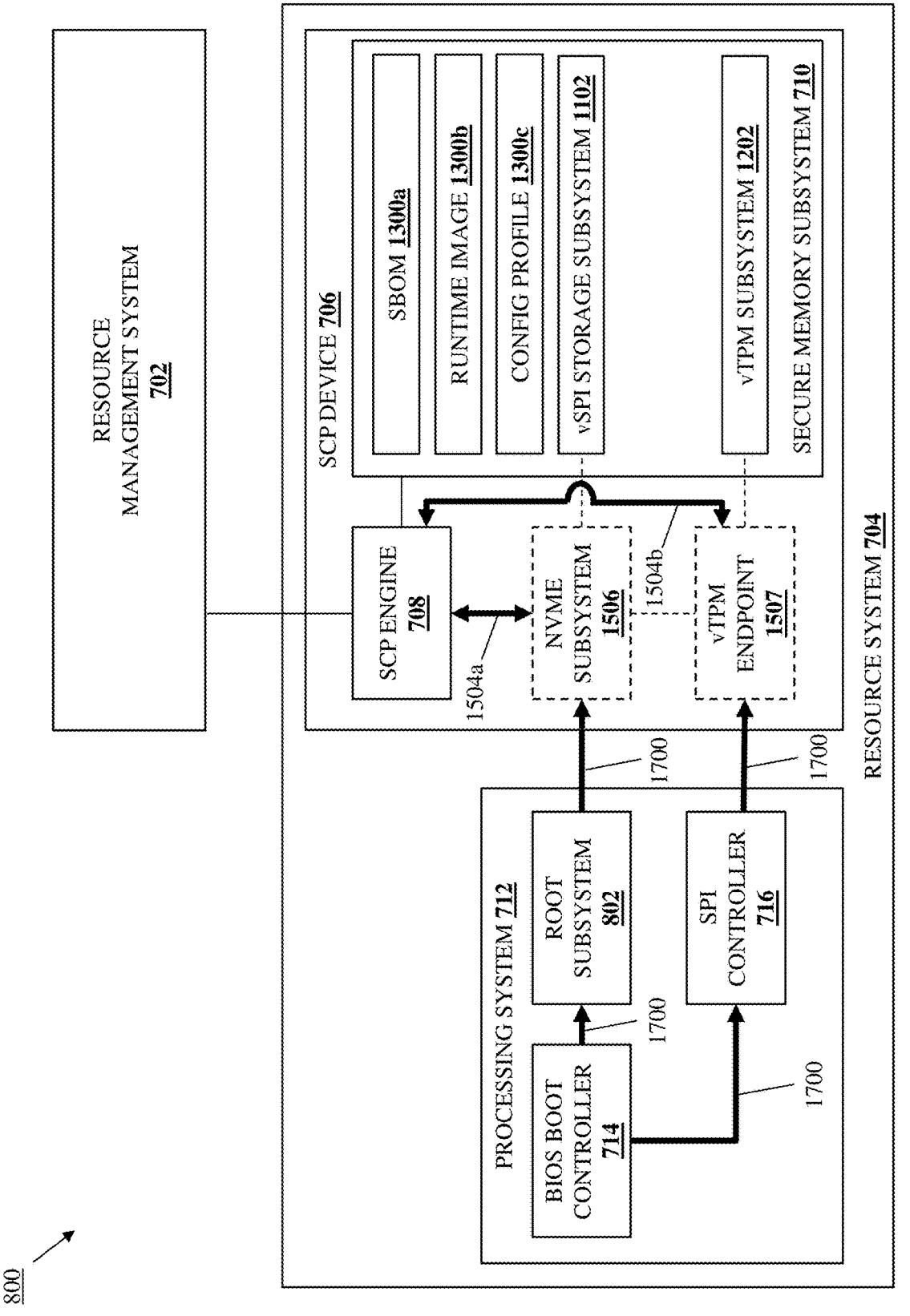
FIG. 17A is a schematic view illustrating an embodiment of the LCS provisioning system of FIG. 8 operating during the method of FIG. 10.

With reference to FIG. 17A, in an embodiment of block 1008, the BIOS boot controller 714 in the processing system 712 of the resource system 704 may perform initialization information request operations 1700 that include generating an initialization information request, transmitting a resource system initialization information portion of the initialization information request via the root subsystem 802 in the processing system 712 and to the NVMe subsystem 1506 provided by the SCP engine 708 (i.e., via the NVMe subsystem provisioning operations 1504a discussed above), and transmitting a resource system initialization authentication information portion of the initialization information request via the SPI controller 716 in the processing system 712 and to the vTPM endpoint 1507 provided by the SCP engine 708 (i.e., via the vTPM endpoint provisioning operations 1504b discussed above). Similarly as described above, as part of initialization operations for the resource system 704 (e.g., to provide an operating system on the resource system 704 using the processing system 712), the BIOS boot controller 714 may use the initialization information request to request resource system initialization information for use in performing those initialization operations, resource system initialization authentication information for authenticating those initialization operations, and/or any other resource system initialization information that would be apparent to one of skill in the art in possession of the present disclosure.

Figure 18A:
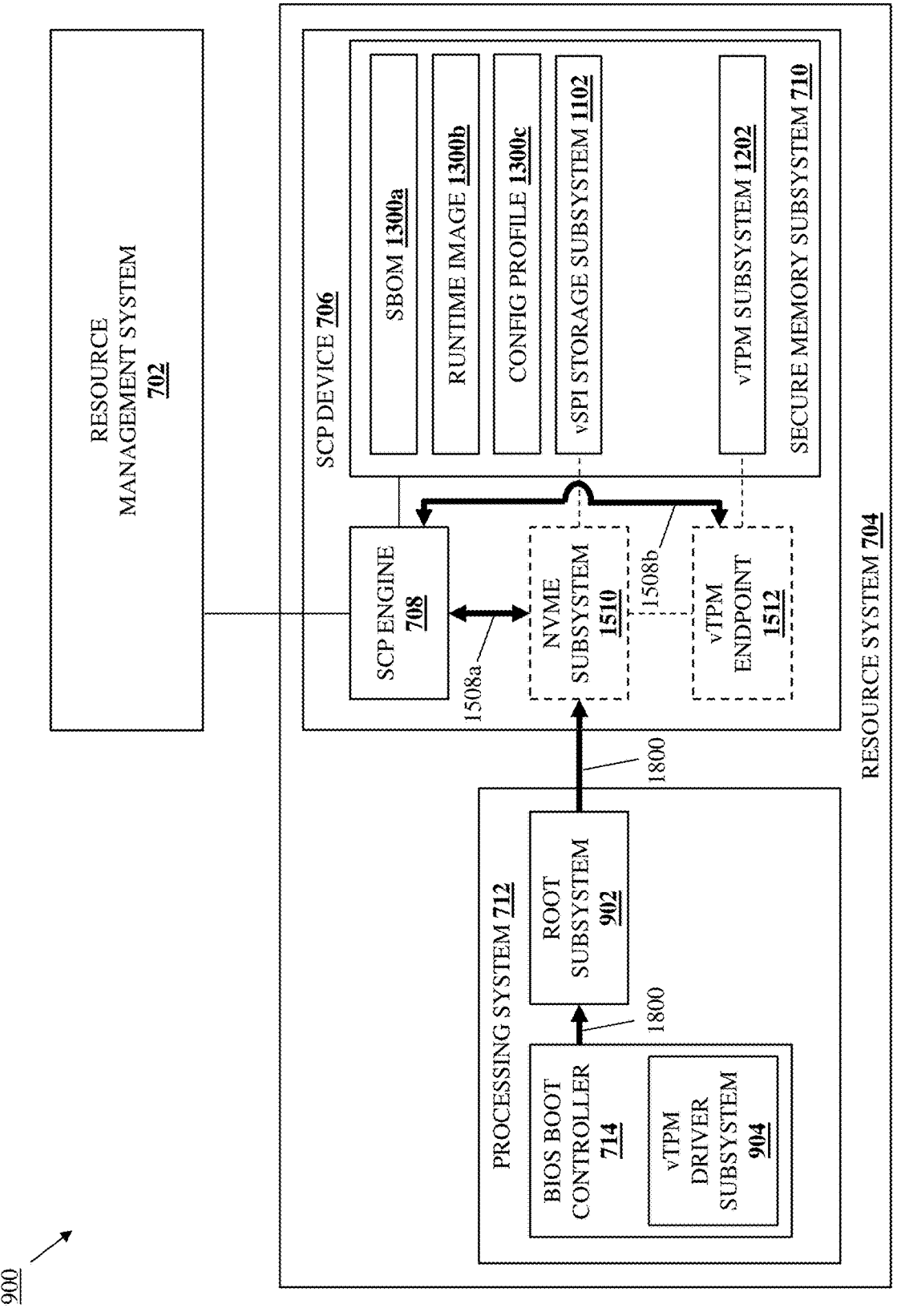
FIG. 18A is a schematic view illustrating an embodiment of the LCS provisioning system of FIG. 9 operating during the method of FIG. 10.

With reference to FIG. 18A, in an embodiment of block 1008, the BIOS boot controller 714 in the processing system 712 of the resource system 704 may perform initialization information request operations 1800 that include generating an initialization information request that include a resource system initialization information portion generated by the BIOS boot controller 714 and a resource system initialization authentication information portion generated using the vTPM driver subsystem 904, and transmitting the initialization information request via the root subsystem 902 in the processing system 712 and to the NVMe subsystem 1510 provided by the SCP engine 708 (i.e., via the NVMe subsystem provisioning operations 1508a discussed above). Similarly as described above, as part of initialization operations for the resource system 704 (e.g., to provide an operating system on the resource system 704 using the processing system 712), the BIOS boot controller 714 may use the initialization information request to request resource system initialization information for use in performing those initialization operations, resource system initialization authentication information for authenticating those initialization operations, and/or any other resource system initialization information that would be apparent to one of skill in the art in possession of the present disclosure.

Figure 16B:
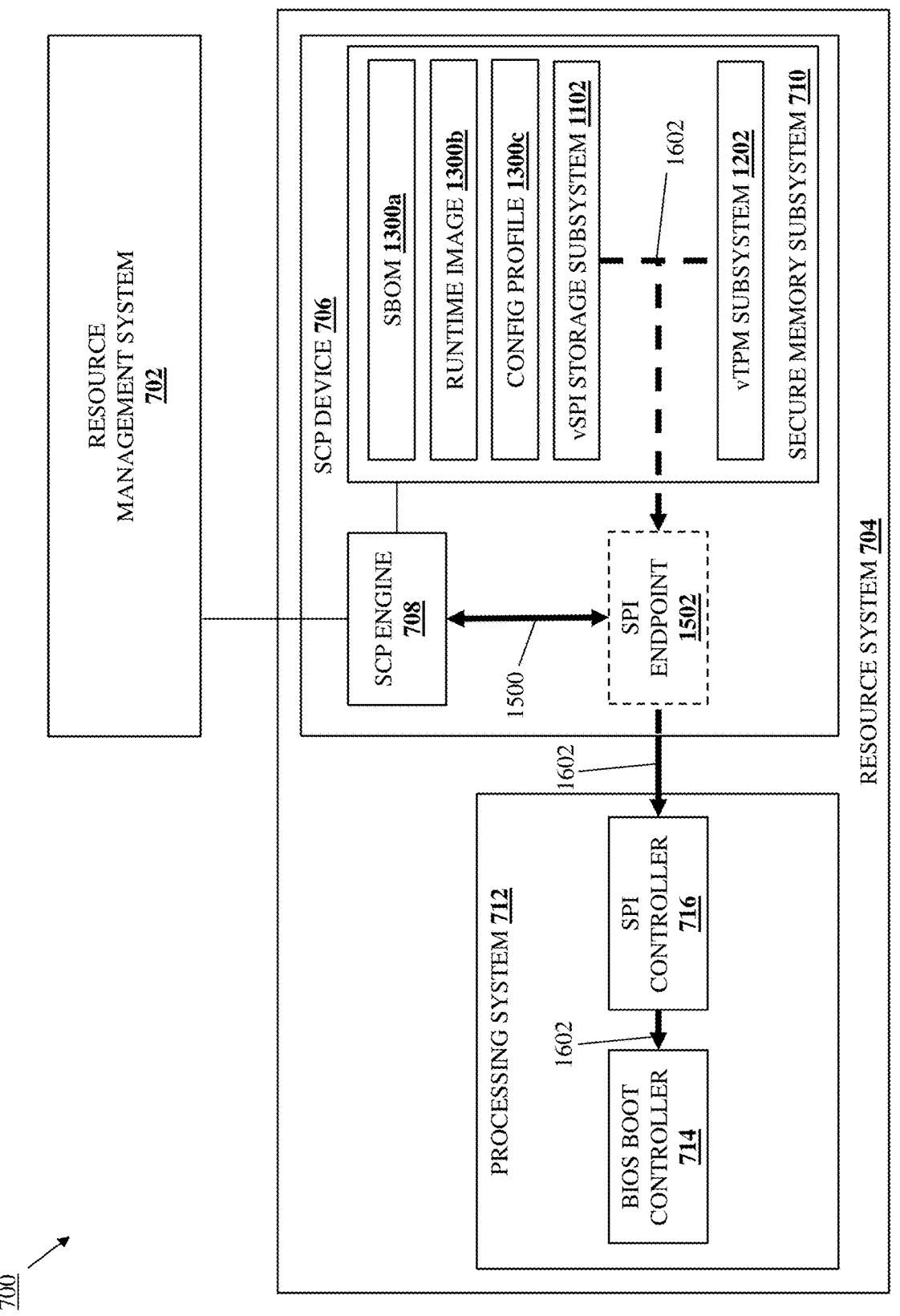
FIG. 16B is a schematic view illustrating an embodiment of the LCS provisioning system of FIG. 7 operating during the method of FIG. 10.

The method 1000 then proceeds to block 1010 where the SCP device provides the resource system initialization information and the resource system initialization authentication information to the processing system. With reference to FIG. 16B, in an embodiment of block 1010, the SPI endpoint 1502 provided by the SCP engine 708 (i.e., via the SPI endpoint provisioning operations 1500 discussed above) may perform initialization information provisioning operations 1602 that may include retrieving resource system initialization information requested at block 1008 from the vSPI storage subsystem 1102, retrieving resource system initialization authentication information requested at block 1008 from the vTPM subsystem 1202, and transmitting that resource system initialization information and resource system initialization authentication information via the SPI controller 716 in the processing system 712 of the resource system 704 and to the BIOS boot controller 714 in the processing system 712. As will be appreciated by one of skill in the art in possession of the present disclosure, the BIOS boot controller 714 may then use the resource system initialization information to perform initialization operations for the resource system 704, and may use the resource system initialization authentication information to authenticate those initialization operations.

Figure 17B:
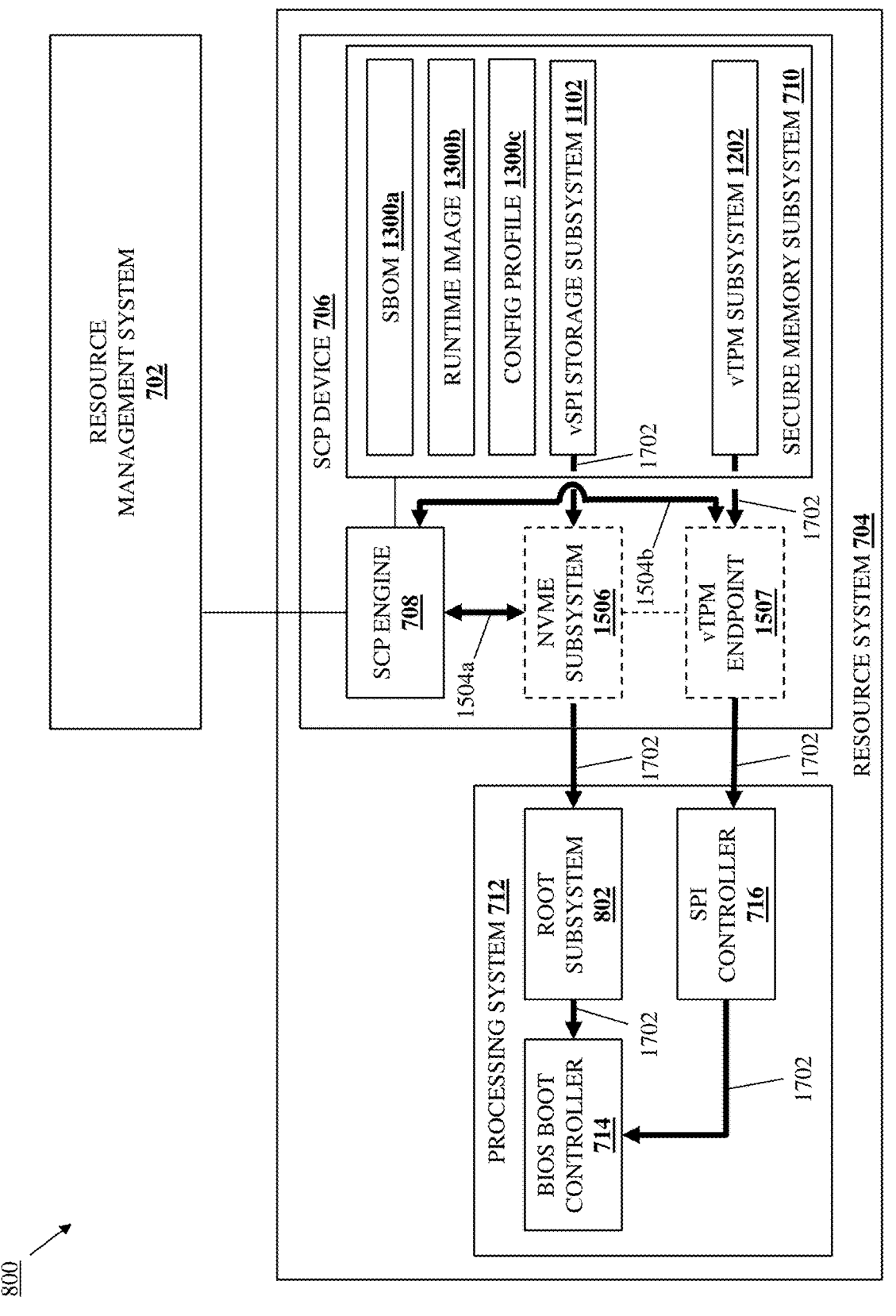
FIG. 17B is a schematic view illustrating an embodiment of the LCS provisioning system of FIG. 8 operating during the method of FIG. 10.

With reference to FIG. 17B, in an embodiment of block 1010, the NVMe subsystem 1506 provided by the SCP engine 708 (i.e., via the NVMe subsystem provisioning operations 1504a discussed above) may perform initialization information provisioning operations 1702 that may include retrieving resource system initialization information requested at block 1008 from the vSPI storage subsystem 1102 and transmitting that resource system initialization information via the root subsystem 802 in the processing system 712 of the resource system 704 and to the BIOS boot controller 714 in the processing system 712. Similarly, the vTPM endpoint 1507 provided by the SCP engine 708 (i.e., via the vTPM endpoint provisioning operations 1504b discussed above) may perform the initialization information provisioning operations 1702 that may include retrieving resource system initialization authentication information requested at block 1008 from the vTPM subsystem 1202 and transmitting the resource system initialization authentication information via the SPI controller 716 in the processing system 712 of the resource system 704 and to the BIOS boot controller 714 in the processing system 712. As will be appreciated by one of skill in the art in possession of the present disclosure, the BIOS boot controller 714 may then use the resource system initialization information to perform initialization operations for the resource system 704, and may use the resource system initialization authentication information to authenticate those initialization operations.

Figure 18B:
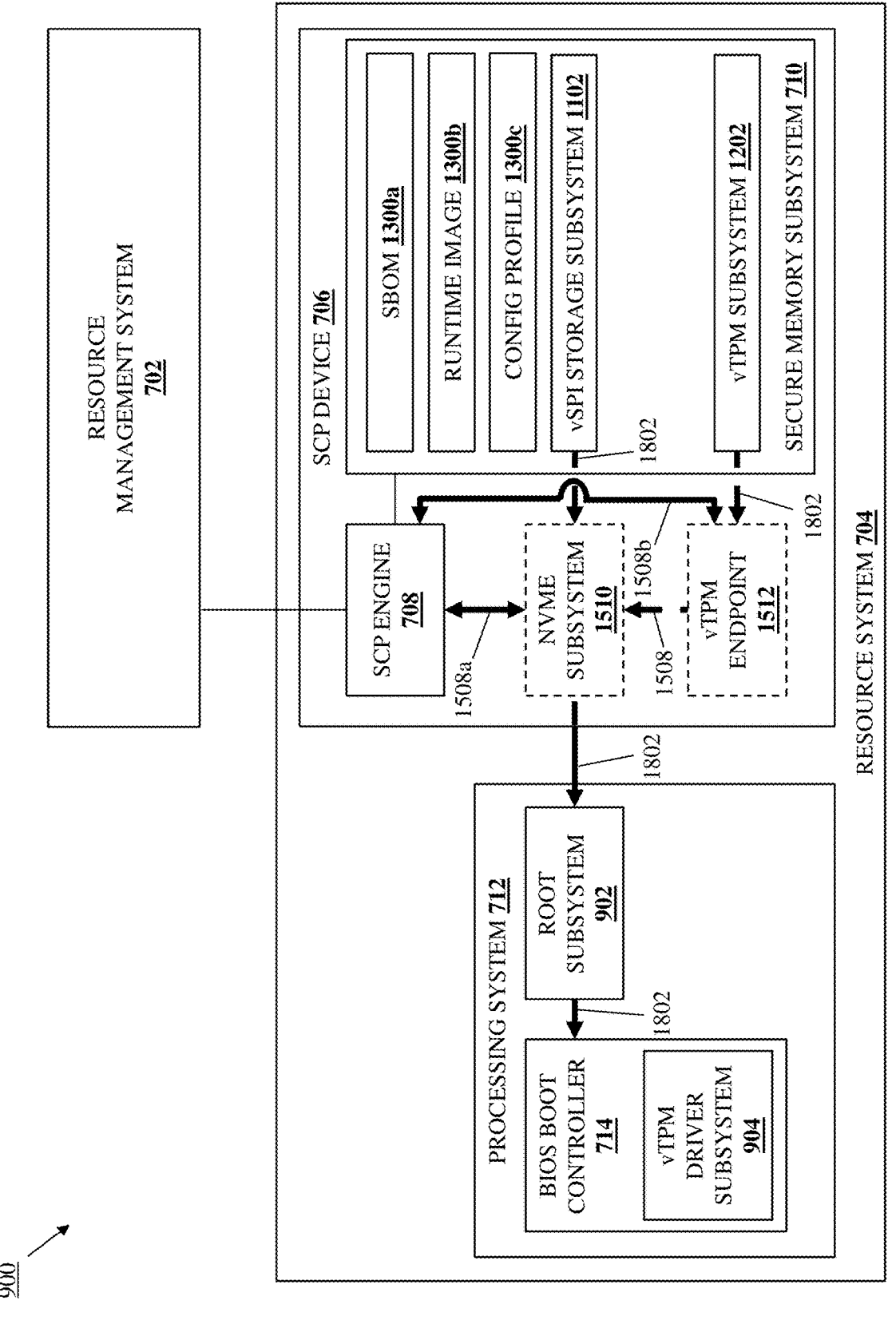
FIG. 18B is a schematic view illustrating an embodiment of the LCS provisioning system of FIG. 9 operating during the method of FIG. 10.

With reference to FIG. 18B, in an embodiment of block 1010, the NVMe subsystem 1510 provided by the SCP engine 708 (i.e., via the NVMe subsystem provisioning operations 1508a discussed above) may perform initialization information provisioning operations 1802 that may include retrieving resource system initialization information requested at block 1008 from the vSPI storage subsystem 1102, retrieving the resource system initialization authentication information from the vTPM subsystem 1202 via the vTPM endpoint 1512 provided by the SCP engine 708 (i.e., via the vTPM endpoint provisioning operations 1508b discussed above), and transmitting that resource system initialization information and resource system initialization authentication information via the root subsystem 802 in the processing system 712 of the resource system 704 and to the BIOS boot controller 714 in the processing system 712 (i.e., with the vTPM driver subsystem 904 handling the resource system initialization authentication information). As will be appreciated by one of skill in the art in possession of the present disclosure, the BIOS boot controller 714 may then use the resource system initialization information to perform initialization operations for the resource system 704, and may use the resource system initialization authentication information to authenticate those initialization operations.

As discussed above, the provisioning of the vSPI storage subsystem 1102 and the vTPM subsystem 1202 in the SCP device 706 of the resource system 704 allows the SCP device 706 to provide a more complete lockdown of the resource system 704 when necessary, as the SCP engine 708 may limit access to the vSPI storage subsystem 1102 and the vTPM subsystem 1202 in the event such a lockdown is necessary (e.g., when a relatively less-trusted operating system is used and must have access to some low level functionality of the resource system 704), and thus retain control of the resource system 704.

Thus, systems and methods have been described that provide for the virtualization of storage for initialization information in a secure memory subsystem of an SCP device that is included in a resource system that initializes using that initialization information. For example, the initialization information storage virtualization system of the present disclosure may include a resource system that is coupled to a resource management system and that includes a processing system coupled to a System Control Processor (SCP) device. The SCP device creates a virtual initialization information storage and a virtual Trusted Platform Module (vTPM) in its secure memory subsystem. The SCP device then receives resource system initialization information and resource system initialization authentication information for the resource system from the resource management system, populates the virtual initialization information storage with the resource system initialization information, and populates the vTPM with the resource system initialization authentication information. When the SCP device receives an initialization information request from the processing system, the SCP device provides the resource system initialization information and the resource system initialization authentication information to the processing system.

As will be appreciated by one of skill in the art in possession of the present disclosure, the SCP device of the present disclosure may replace the root-of-trust for processing systems provided in conventional resource systems (e.g., the root-of-trust for processing systems in conventional resource systems is typically provided on the motherboard in the resource system) via its signing key (i.e., the signing key of the SCP device may be enrolled as the processing system root-of-trust) to allow each resource system to be booted or otherwise initialized in a manner that is tightly coupled to its control plane (i.e., provided by that SCP device and a resource management system), thus allowing the resource management system to deploy any signed firmware on a resource system at any point in time.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An initialization information storage virtualization system, comprising:

a resource management system; and a resource system that is coupled to the resource management system and that includes:

a processing system; and a System Control Processor (SCP) device that is coupled to the processing system and that is configured to:

program a secure memory subsystem in the SCP device to emulate a storage space and configure that storage space to store initialization information to create a virtual initialization information storage in the secure memory subsystem in the SCP device;

program the secure memory subsystem in the SCP device to emulate a virtual Trusted Platform Module (vTPM) interface, enable TPM request response engines, and populate register values to create a virtual TPM in the secure memory subsystem in the SCP device;

receive, from the resource management system, resource system initialization information for the resource system, and populate the virtual initialization information storage with the resource system initialization information;

receive, from the resource management system, resource system initialization authentication information for the resource system, and populate the vTPM with the resource system initialization authentication information;

receive an initialization information request from the processing system; and provide, in response to the initialization information request, the resource system initialization information and the resource system initialization authentication information to the processing system.

2. The system of claim 1, wherein the SCP device is configured to:

receive, from the resource management system, a Software Bill Of Materials (SBOM) that identifies software resources in the resource system; and store the SBOM in the secure memory subsystem in the SCP device.

3. The system of claim 1, wherein the SCP device is configured to:

receive, from the resource management system, a runtime image for the resource system, wherein the resource system initialization information includes a subset of the runtime image; and store the runtime image in the secure memory subsystem in the SCP device.

4. The system of claim 1, wherein the SCP device is configured to:

receive, from the resource management system, a configuration profile for the resource system that defines a configuration of the resource system, wherein the resource system initialization information includes a subset of the configuration profile; and store the configuration profile in the secure memory subsystem in the SCP device.

5. The system of claim 1, wherein the SCP device is configured to:

provide a Serial Peripheral Interface (SPI) endpoint; and use the SPI endpoint to:

receive the initialization information request from the processing system, and provide the resource system initialization information and the resource system initialization authentication information to the processing system.

6. The system of claim 1, wherein the SCP device is configured to:

provide a Non-Volatile Memory express (NVMe) subsystem; and use the NVMe subsystem to:

receive the initialization information request from the processing system, and provide the resource system initialization information to the processing system.

7. A System Control Processor (SCP) device, comprising:

a System Control Processor (SCP) processing system; and an SCP memory system that is coupled to the SCP processing system and that includes instructions that, when executed by the SCP processing system, cause the SCP processing system to provide an SCP engine that is configured to:

program a secure portion of the SCP memory system to emulate a storage space and configure that storage space to store initialization information to create a virtual initialization information storage in the secure portion of the SCP memory system of the SCP device;

program the secure portion of the SCP memory system to emulate a virtual Trusted Platform Module (vTPM) interface, enable TPM request response engines, and populate register values to create a virtual TPM in the secure portion of the SCP memory system of the SCP device;

receive, from a resource management system, resource system initialization information for a resource system that includes the SCP processing system, and populate the virtual initialization information storage with the resource system initialization information;

receive, from the resource management system, resource system initialization authentication information for the resource system, and populate the vTPM with the resource system initialization authentication information;

receive an initialization information request from a host processing system that is included in the resource system; and provide, in response to the initialization information request, the resource system initialization information and the resource system initialization authentication information to the host processing system.

8. The SCP device of claim 7, wherein the SCP engine is configured to:

receive, from the resource management system, a Software Bill Of Materials (SBOM) that identifies software resources in the resource system; and store the SBOM in the secure portion of the SCP memory system in the SCP device.

9. The SCP device of claim 7, wherein the SCP engine is configured to:

receive, from the resource management system, a runtime image for the resource system, wherein the resource system initialization information includes a subset of the runtime image; and store the runtime image in the secure portion of the SCP memory system in the SCP device.

10. The SCP device of claim 7, wherein the SCP engine is configured to:

receive, from the resource management system, a configuration profile for the resource system that defines a configuration of the resource system, wherein the resource system initialization information includes a subset of the configuration profile; and store the configuration profile in the secure portion of the SCP memory system in the SCP device.

11. The SCP device of claim 7, wherein the SCP engine is configured to:

provide a Serial Peripheral Interface (SPI) endpoint; and use the SPI endpoint to:

receive the initialization information request from the host processing system, and provide the resource system initialization information and the resource system initialization authentication information to the host processing system.

12. The SCP device of claim 7, wherein the SCP engine is configured to:

provide a Non-Volatile Memory express (NVMe) subsystem; and use the NVMe subsystem to:

receive the initialization information request from the host processing system, and provide the resource system initialization information to the host processing system.

13. The SCP device of claim 12, wherein the SCP engine is configured to:

provide a vTPM endpoint; and use the vTPM endpoint to:

receive the initialization information request from the host processing system, and provide resource system initialization authorization information to the host processing system.

14. A method for virtualizing storage for computing device initialization information, comprising:

programming, by a System Control Processor (SCP) device that is included in a resource system, a secure memory subsystem in the SCP device to emulate a storage space and configure that storage space to store initialization information to create a virtual initialization information storage in the secure memory subsystem in the SCP device;

programming, by the SCP device, the secure memory subsystem in the SCP device to emulate a virtual Trusted Platform Module (vTPM) interface, enable TPM request response engines, and populate register values to create a virtual TPM in the secure memory subsystem in the SCP device;

receive, by the SCP device from a resource management system, resource system initialization information for the resource system, and populating the virtual initialization information storage with the resource system initialization information;

receive, by the SCP device from the resource management system, resource system initialization authentication information for the resource system, and populating the vTPM with the resource system initialization authentication information;

receiving, by the SCP device, an initialization information request from a processing system that is included in the resource system; and providing, by the SCP device in response to the initialization information request, the resource system initialization information and the resource system initialization authentication information to the processing system.

15. The method of claim 14, further comprising:

receiving, by the SCP device from the resource management system, a Software Bill Of Materials (SBOM) that identifies software resources in the resource system; and storing, by the SCP device, the SBOM in the secure memory subsystem in the SCP device.

16. The method of claim 14, further comprising:

receiving, by the SCP device from the resource management system, a runtime image for the resource system, wherein the resource system initialization information includes a subset of the runtime image; and storing, by the SCP device, the runtime image in the secure memory subsystem in the SCP device.

17. The method of claim 14, further comprising:

receiving, by the SCP device from the resource management system, a configuration profile for the resource system that defines a configuration of the resource system, wherein the resource system initialization information includes a subset of the configuration profile; and storing, by the SCP device, the configuration profile in the secure memory subsystem in the SCP device.

18. The method of claim 14, further comprising:

providing, by the SCP device, a Serial Peripheral Interface (SPI) endpoint; and using, by the SCP device, the SPI endpoint to:

receive the initialization information request from the processing system, and provide the resource system initialization information and the resource system initialization authentication information to the processing system.

19. The method of claim 14, further comprising:

providing, by the SCP device, a Non-Volatile Memory express (NVMe) subsystem; and using, by the SCP device, the NVMe subsystem to:

receive the initialization information request from the processing system, and provide the resource system initialization information to the processing system.

20. The method of claim 14, further comprising:

providing, by the SCP device, a vTPM endpoint; and using, by the SCP device, the vTPM endpoint to:

receive the initialization information request from the processing system, and provide resource system initialization authorization information to the processing system.

* * * * *